(12) United States Patent
Nikiforuk

(10) Patent No.: US 9,528,330 B2
(45) Date of Patent: Dec. 27, 2016

(54) SYSTEM AND METHOD FOR TRANSPORTING TUBULAR ONTO A DRILLING RIG

(71) Applicant: Tesco Corporation, Houston, TX (US)

(72) Inventor: Kevin James Nikiforuk, Houston, TX (US)

(73) Assignee: TESCO CORPORATION, Houston, TX (US)

( * ) Notice: Subject to any disclaimer, the term of this patent is extended or adjusted under 35 U.S.C. 154(b) by 306 days.

(21) Appl. No.: 14/084,334

(22) Filed: Nov. 19, 2013

(65) Prior Publication Data
US 2015/0139773 A1    May 21, 2015

(51) Int. Cl.
| E21B 19/15 | (2006.01) |
| B65G 15/24 | (2006.01) |
| B65G 15/42 | (2006.01) |
| B65G 21/10 | (2006.01) |

(52) U.S. Cl.
CPC ............. *E21B 19/155* (2013.01); *B65G 15/24* (2013.01); *E21B 19/15* (2013.01); *B65G 15/42* (2013.01); *B65G 21/10* (2013.01)

(58) Field of Classification Search
CPC ........ E21B 19/155; E21B 19/15; E21B 19/14; E21B 19/22; E21B 19/24; E21B 19/20; B65G 37/00; B65G 21/16; B65G 21/10; B65G 15/08; B65G 15/24; B65G 15/10; B65G 15/40; B65G 15/42; B65G 15/18; B65G 15/12; B65G 15/22; B65G 47/1428
See application file for complete search history.

(56) References Cited

U.S. PATENT DOCUMENTS

| 810,510 | A | * | 1/1906 | Robins | .................. B65G 15/08 198/690.2 |
| 955,264 | A | * | 4/1910 | Harris | .................... B65G 37/00 198/593 |
| 2,241,640 | A | * | 5/1941 | Hemley | ................. B65G 15/42 198/690.2 |
| 2,303,762 | A | * | 12/1942 | La Rue | ................. B65G 15/42 198/690.2 |
| 2,900,091 | A | | 8/1959 | Minter | |

(Continued)

FOREIGN PATENT DOCUMENTS

| CA | 2224638 | 6/1999 |
| CA | 2431213 A1 | 10/2004 |

(Continued)

OTHER PUBLICATIONS

PCT Invitation to Pay Additional Fees mailed Sep. 18, 2015.

*Primary Examiner* — Glenn Myers
(74) *Attorney, Agent, or Firm* — Fletcher Yoder, P.C.

(57) ABSTRACT

A conveyor assembly for transporting tubular onto a drilling rig includes a plurality of conveyor sections coupled together end to end. The conveyor sections are configured to receive and transport the tubular. Each of the plurality of conveyor sections includes a conveyor belt having treads for transporting the tubular along the conveyor section. The conveyor assembly also includes an actuation assembly configured to transition the plurality of conveyor sections between a first orientation and a second orientation. The conveyor sections are not aligned in the first orientation, and the conveyor sections are substantially aligned in the second orientation.

15 Claims, 13 Drawing Sheets

(56) References Cited

U.S. PATENT DOCUMENTS

| | | | |
|---|---|---|---|
| 2,925,165 A * | 2/1960 | Rake | B65G 15/42 198/690.2 |
| 3,182,998 A * | 5/1965 | Peterson | B21D 43/18 198/689.1 |
| 3,197,021 A * | 7/1965 | Williams | B65G 15/08 139/411 |
| 3,650,330 A * | 3/1972 | Gieringer | A01B 45/04 172/19 |
| 3,756,382 A * | 9/1973 | Adey, Jr. | B65G 15/42 198/690.2 |
| 3,780,883 A | 12/1973 | Brown | |
| 3,841,941 A * | 10/1974 | Leblond | B29D 30/3007 156/133 |
| 3,850,283 A * | 11/1974 | Nordstrom | B60P 1/52 198/313 |
| 4,293,062 A * | 10/1981 | Bustos | B65G 21/02 193/2 D |
| 4,386,883 A | 6/1983 | Hogan et al. | |
| 4,403,898 A | 9/1983 | Thompson | |
| 4,426,182 A * | 1/1984 | Frias | E21B 19/15 193/17 |
| 4,434,572 A * | 3/1984 | Sheldon | A01K 79/00 114/255 |
| 4,470,740 A * | 9/1984 | Frias | E21B 19/15 414/22.61 |
| 4,494,899 A | 1/1985 | Hoang et al. | |
| 6,899,510 B2 | 5/2005 | Morelli et al. | |
| 6,994,505 B2 | 2/2006 | Hawkins, III | |
| 7,021,880 B2 | 4/2006 | Morelli et al. | |
| 7,163,367 B2 | 1/2007 | Handley | |
| 7,278,533 B2 * | 10/2007 | Horn | B65G 15/12 198/626.1 |
| 8,016,536 B2 | 9/2011 | Gerber et al. | |
| 8,033,779 B2 | 10/2011 | Gerber et al. | |
| 8,052,368 B2 | 11/2011 | Littlewood et al. | |
| 8,215,887 B2 | 7/2012 | Fikowski et al. | |
| 8,454,296 B2 | 6/2013 | Gerber et al. | |
| 8,756,998 B1 * | 6/2014 | Joplin | G01N 29/11 221/2 |
| 2002/0104736 A1* | 8/2002 | Peppel | B65G 47/647 198/369.2 |
| 2003/0196791 A1 | 10/2003 | Dunn et al. | |
| 2005/0238463 A1 | 10/2005 | Smith | |
| 2008/0138174 A1 | 6/2008 | Hawkins | |
| 2008/0263990 A1 | 10/2008 | Morelli et al. | |
| 2011/0070054 A1 | 3/2011 | Crossley et al. | |
| 2012/0121364 A1 | 5/2012 | Taggart et al. | |
| 2015/0008038 A1 | 1/2015 | Folk | |

FOREIGN PATENT DOCUMENTS

| | | |
|---|---|---|
| CA | 2431229 A1 | 10/2004 |
| CA | 2510137 A1 | 12/2005 |

* cited by examiner

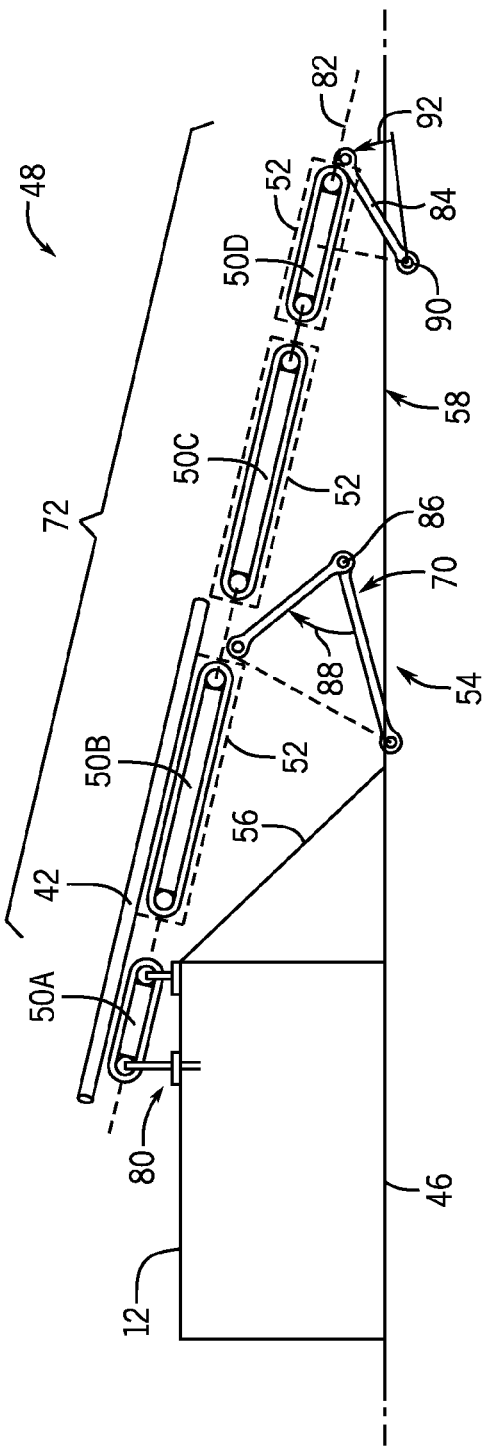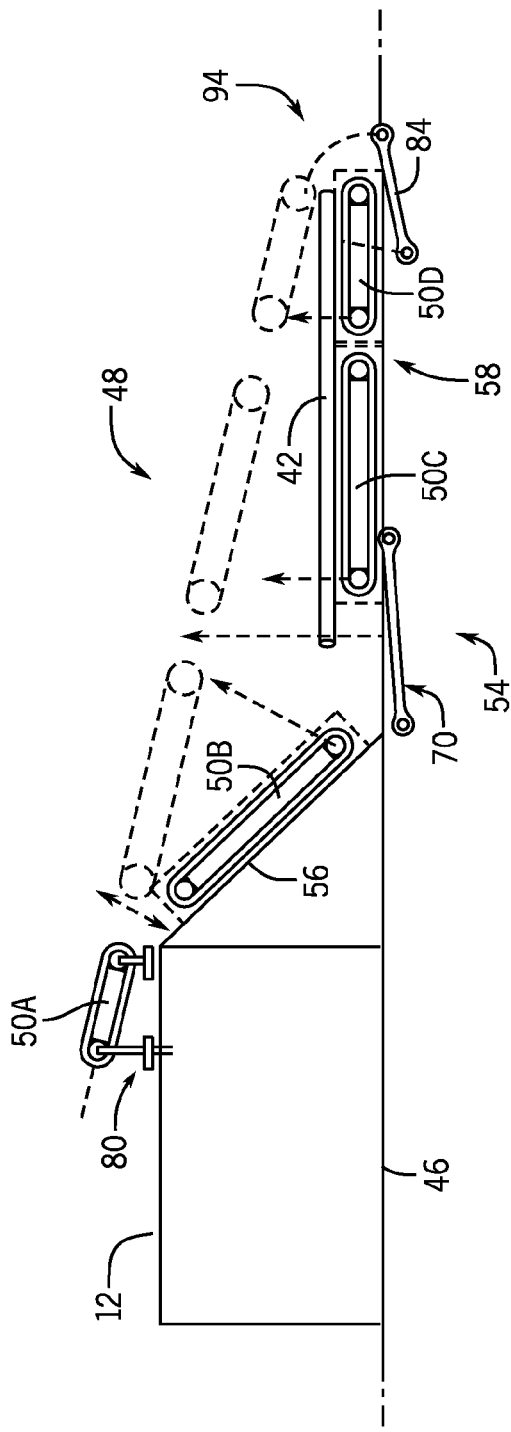

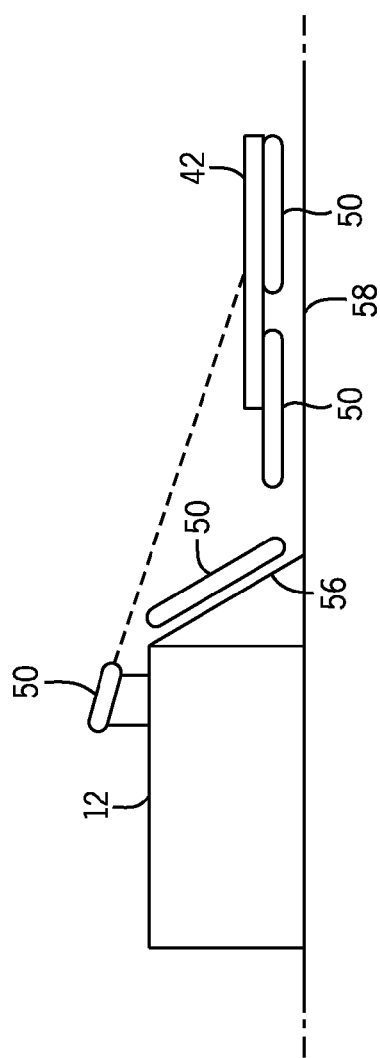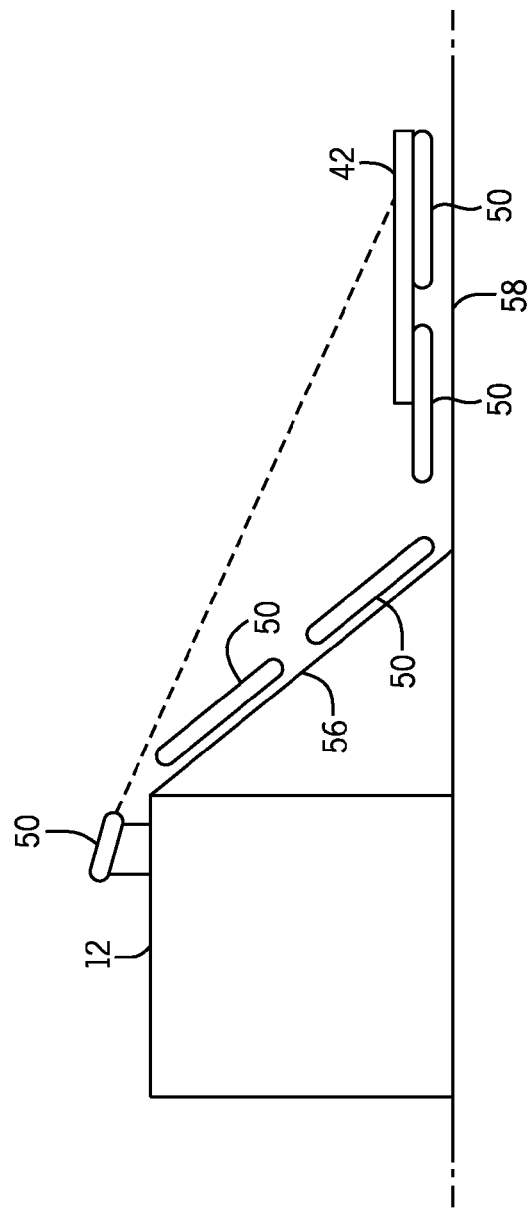

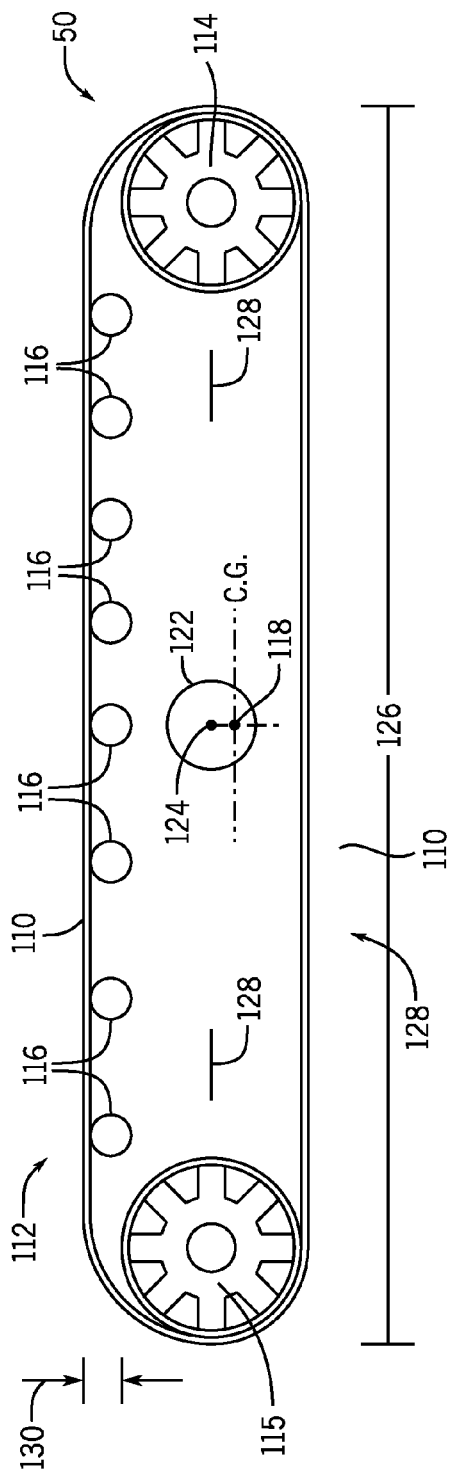
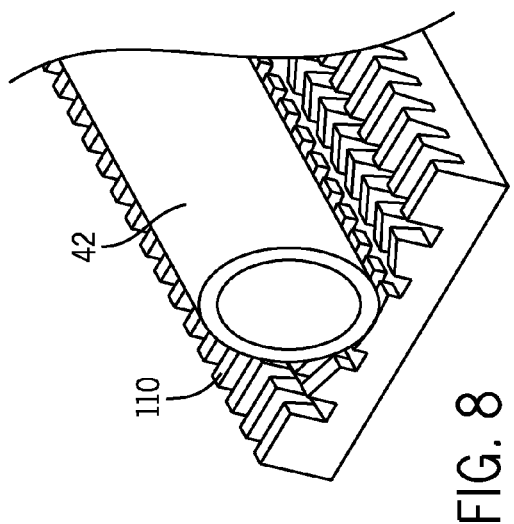
FIG. 8
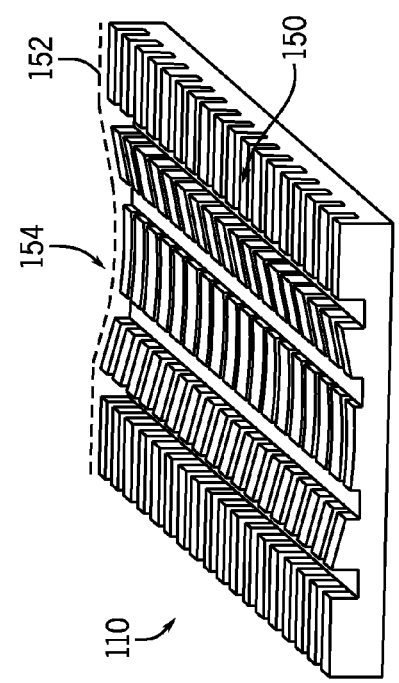
FIG. 7
FIG. 6

SYSTEM AND METHOD FOR TRANSPORTING TUBULAR ONTO A DRILLING RIG

BACKGROUND

Embodiments of the present disclosure relate generally to the field of drilling and processing of wells. More particularly, present embodiments relate to systems and methods for transporting tubular onto a drilling rig.

In conventional oil and gas operations, a well is typically drilled to a desired depth with a drill string, which includes drill pipe and a drilling bottom hole assembly. Once the desired depth is reached, the drill string is removed from the hole and casing is run into the vacant hole. Casing may be defined as pipe or tubular that is placed in a well to prevent the well from caving in, to contain fluids, and to assist with efficient extraction of product. Tubular may be defined as including drill pipe, casing, or any other type of substantially cylindrical component or assembly utilized in drilling or well processing operations.

In conventional operations, the drill string is lowered into the wellbore from an elevated rig floor. Prior to adding a new length of tubular to the drill string, the tubular is first transported from a pipe rack near the ground onto the elevated rig floor. Once above the rig floor, the tubular is typically positioned above an opening in the rig floor, such as above well center or above a mousehole of the drilling rig. The tubular can then be connected to other lengths of tubular or lowered into the opening.

It is now recognized that there exists a need for improved systems and methods for transporting tubular onto the elevated rig floor.

BRIEF DESCRIPTION

In accordance with one aspect of the present disclosure, a conveyor assembly configured to transport a tubular onto a drilling rig is provided. The conveyor assembly includes a plurality of conveyor sections coupled together end to end. The conveyor sections are configured to receive and transport the tubular, and each of the plurality of conveyor sections includes a conveyor having treads for transporting the tubular along the conveyor section. The conveyor assembly also includes an actuation assembly configured to transition the plurality of conveyor sections between a first orientation and a second orientation. The plurality of conveyor sections are not aligned in the first orientation, and the plurality of conveyor sections are substantially aligned in the second orientation In accordance with another aspect of the present disclosure, a conveyor assembly configured for use on a drilling rig is provided. The conveyor assembly includes a stationary conveyor section coupled to a rig floor of the drilling rig. The conveyor assembly also includes an articulating conveyor section disposed adjacent the stationary conveyor section and configured to move relative to the stationary conveyor section. In addition, the conveyor assembly includes a base conveyor section coupled to an end of the articulating conveyor section opposite the stationary conveyor section. Further, the conveyor assembly includes an actuation assembly configured to transition the articulating conveyor section and the base conveyor section between a lowered position and a raised position. In the lowered position, the base conveyor section is disposed proximate a catwalk area and the articulating conveyor section is disposed against an inclined ramp between the catwalk area and the rig floor. In the raised position, the base conveyor section and the articulated conveyor section are aligned with the stationary conveyor section.

Present embodiments also provide a method for transporting tubular onto a rig floor using a conveyor assembly. The method includes receiving drilling equipment onto a base conveyor section disposed proximate a catwalk area of a drilling rig. The method also includes actuating a hydraulic lifting arm to raise the base conveyor section into alignment with an array of conveyor sections coupled end to end between the catwalk area and a rig floor of the drilling rig. In addition, the method includes actuating conveyor belts on the base conveyor section and the array of conveyor sections to transport the drilling equipment up the array of conveyor sections toward the rig floor.

In accordance with another aspect of the present embodiments, a system includes a cushioned stop mechanism configured to slow movement of a conveyor assembly used to transition a tubular element between a catwalk area and a rig floor of a drilling rig. The cushioned stop mechanism includes a chamber of hydraulic fluid, a plug extending partially into the chamber, and a lever having a first end and a second end opposite each other. The plug includes an extended portion extending away from the chamber. The first end of the lever is disposed in a path of the tubular element being moved by the conveyor assembly. The second end of the lever is disposed proximate the extended portion of the plug such that, when the tubular element pushes the roller, the lever pivots about a pivot point and pushes the plug into the hydraulic chamber to slow the movement of the conveyor assembly.

Present embodiments also include a conveyor assembly configured to transport a tubular relative to a drilling rig. The conveyor assembly includes pipe kickers configured to remove a tubular element from the conveyor assembly. The pipe kickers include a trough section with a concave profile configured to support the tubular element when the pipe kicker is not activated. The pipe kickers also include at least one piston coupled to a first side of the trough section and a hydraulic valve configured to actuate the piston. When the hydraulic valve actuates the piston, the piston pushes the first side of the trough section upward relative to a second side of the trough section opposite the first to eject the tubular element from the conveyor assembly.

DRAWINGS

These and other features, aspects, and advantages of the present embodiments will become better understood when the following detailed description is read with reference to the accompanying drawings in which like characters represent like parts throughout the drawings, wherein:

FIG. 2 is a schematic side view of an articulated conveyor assembly disposed in a raised position for transporting a tubular onto a rig floor in accordance with an embodiment of the present techniques;

FIG. 3 is a schematic side view of the articulated conveyor assembly of FIG. 2 disposed in a lowered position for receiving a tubular in accordance with an embodiment of the present techniques;

FIG. 4 is a schematic side view of an articulated conveyor assembly having three conveyor sections in accordance with an embodiment of the present techniques;

FIG. 5 is a schematic side view of an articulated conveyor assembly having four conveyor sections in accordance with an embodiment of the present techniques;

FIG. 6 is a schematic representation of a single conveyor section of the articulated conveyor assembly of FIG. 2 in accordance with an embodiment of the present techniques;

FIG. 7 is a perspective cutaway view of treads disposed along an outer edge of the conveyor section of FIG. 6 in accordance with an embodiment of the present techniques;

FIG. 8 is a perspective cutaway view of the treads of FIG. 7 holding a tubular in accordance with an embodiment of the present techniques;

DETAILED DESCRIPTION

Presently disclosed embodiments are directed toward systems and methods for transporting tubular from a ground position to a position above an elevated rig floor of a drilling rig. Specifically, the systems include a conveyor assembly that can be actuated between a lowered position and a raised position. The conveyor assembly includes an array of separate conveyor sections that are coupled end to end via frames. These frames allow the conveyor sections to be moveable relative to one another. In the lowered position, one or more "base" conveyor sections of the conveyor assembly are located flat on a loading area (e.g., catwalk or ground surface), in order to receive or reject tubular elements. In the lowered position, an "articulated" middle section of the conveyor assembly may be laid against an angled V-door of the drilling rig. In the raised position, all of the conveyor sections are aligned with each other. In this way, the conveyor sections are in a substantially aligned orientation when raised, and in an unaligned orientation when lowered. A hydraulic arm, or other frame actuation mechanism, lifts the frames and the conveyor sections from the lowered position (e.g., unaligned orientation) to the raised position (e.g., aligned orientation). The conveyor section located at the rig floor end of the conveyor assembly may be a stationary section that does not move, even when the hydraulic arm raises the other conveyor sections into alignment with the floor section. As described in detail below, the disclosed conveyor assembly may provide a tubular transportation system that is more lightweight, simpler to control, and more adaptable to rigs of different sizes and in different locations than existing laydown trucks or power catwalks.

Figure 1:
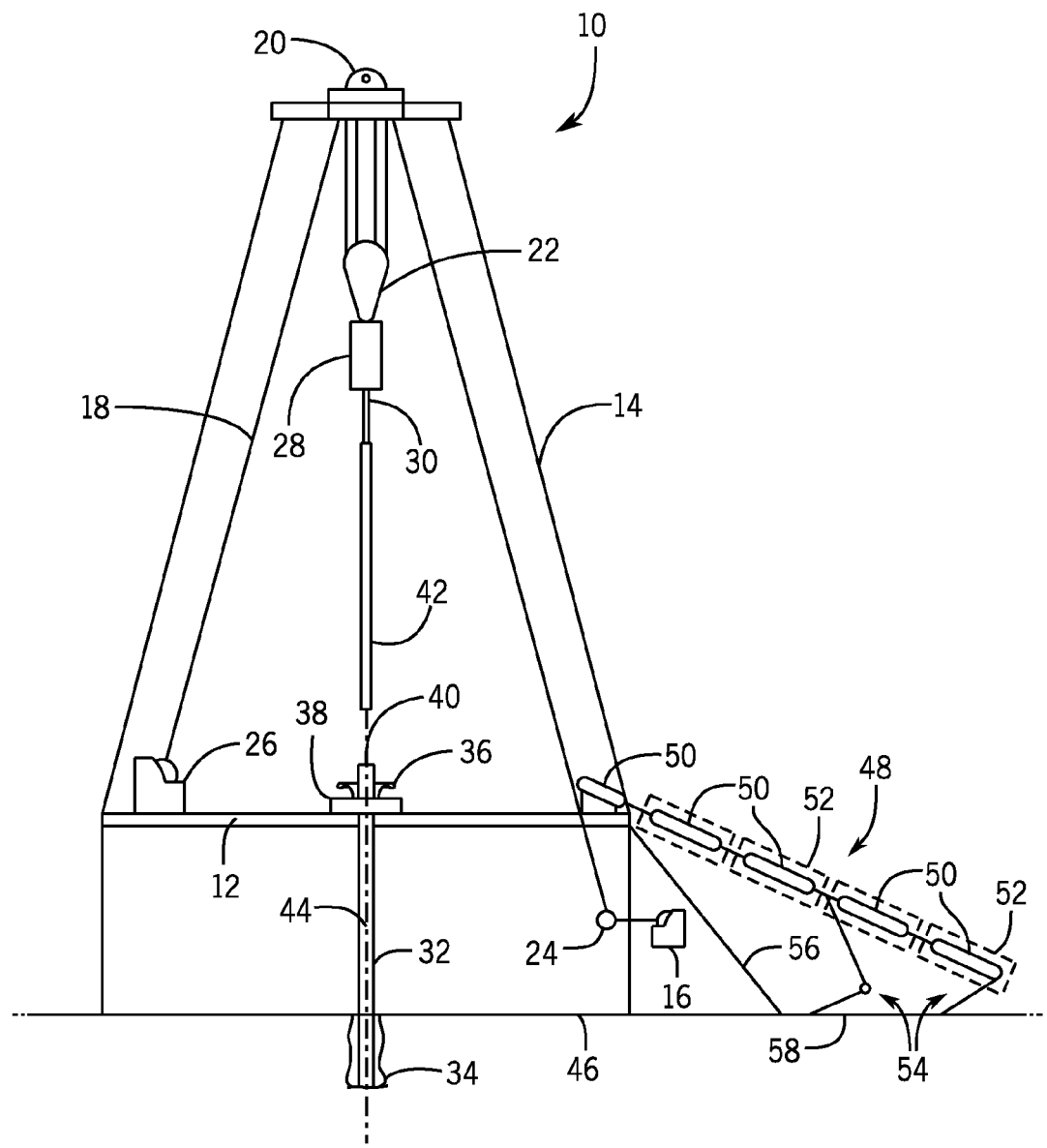
FIG. 1 is a schematic representation of a well being drilled in accordance with an embodiment of the present techniques.

Turning now to the drawings, FIG. 1 is a schematic representation of a drilling rig 10 in the process of drilling a well in accordance with an embodiment of the present disclosure. The drilling rig 10 features an elevated rig floor 12 and a derrick 14 extending above the rig floor 12. A supply reel 16 supplies drilling line 18 to a crown block 20 and traveling block 22 configured to hoist various types of drilling equipment above the rig floor 12. The drilling line 18 is secured to a deadline tiedown anchor 24, and a drawworks 26 regulates the amount of drilling line 18 in use and, consequently, the height of the traveling block 22 at a given moment. The traveling block 22 supports a top drive 28, which features a quill 30 used to turn tubular or other drilling equipment. Below the rig floor 12, a tubular string 32 extends downward into a wellbore 34 and is held stationary with respect to the rig floor 12 by a spider or slips 36 of a rotary table 38. A portion of the tubular string 32 extends above the rig floor 12, forming a stump 40 to which another tubular element 42 (e.g., a joint of drillpipe) is in the process of being added.

In the illustrated embodiment, the top drive 28 is hoisting the tubular element 42 to a vertically aligned position over well center. That is, the tubular element 42 is aligned with a vertical axis 44 that passes through the center of the wellbore 34. When the tubular element 42 is aligned with well center, it is also aligned with the center of the quill 30, the stump 40, and the tubular string 32 extending into the wellbore 34. From this position, the tubular element 42 can be lowered (e.g., stabbed) onto the stump 40, rotated to form the connection, and eventually lowered into the wellbore 34.

Before the tubular element 42 can be brought into alignment with the axis 44, the tubular element 42 may be transported from a position near a ground surface 46 to a position near the rig floor 12 using presently disclosed techniques. From the position near the rig floor 12, the tubular element 42 may be engaged by the top drive 28, or by elevators coupled to the top drive 28. In presently disclosed embodiments, the tubular element 42 is transported to the rig floor 12 via a conveyor assembly 48. The conveyor assembly 48 is a positive drive pipe conveyor system that may be used to transport tubular elements 42 from the ground surface 46 to the rig floor 12 (e.g., during rig up operations) and from the rig floor 12 to the ground surface 46 (e.g., during laydown operations).

The conveyor assembly 48 includes multiple separate conveyor sections 50 with conveyor belts that rotate along an outer edge of the conveyor sections 50 to transport tubular elements 42 thereon. The conveyor belt of each conveyor section 50 rotates relative to a frame 52 that holds the conveyor section 50. These frames 52 may be movable relative to the rig floor 12 via a frame actuation assembly 54 that lifts and lowers the frames 52 and, consequently, the conveyor sections 50. Embodiments of the frame actuation assembly 54 and hydraulics used to control the frame actuation assembly 54 are described in detail below. The conveyor assembly 48 is disposed partially on the rig floor 12 and partially on or over a V-door 56 and a catwalk area 58 of the drilling rig 10. The V-door 56 is a ramp or slide along which various pieces of drilling equipment are typically pulled up onto the rig floor 12 or lowered down to the ground surface 46. The catwalk area 58 is a platform located on the ground surface 46 or slightly elevated from the ground surface 46. The catwalk area 58 functions generally as a staging area for positioning machinery, tubular, and other drilling equipment that is to be brought onto the rig floor 12.

It should be noted that the illustration of FIG. 1 is intentionally simplified to focus on the conveyor assembly 48 described in detail below. Many other components and tools may be employed during the various periods of formation and preparation of the well. In some embodiments, for example, the illustrated top drive 28 may be replaced by a swivel in a drilling rig 10 that utilizes a Kelly drive to turn the tubular string 32. Similarly, as will be appreciated by those skilled in the art, the orientation and environment of the well may vary widely depending upon the location and situation of the formations of interest. For example, rather than a generally vertical bore, the well, in practice, may include one or more deviations, including angled and horizontal runs.

In addition, while shown as a surface (land-based) operation, the well may be formed in water of various depths, in which case the topside equipment may include an anchored or floating platform. The ground surface 46 of the illustrated embodiment may correspond with the water level in such embodiments. The presently disclosed conveyor assembly 48 may be used in such off-shore operations, whereas traditional power catwalks are not adaptable to such environments. Specifically, the disclosed conveyor assembly 48 utilizes relatively simple hydraulic controls and has dimensions that are adjustable to meet the needs of drilling rigs 10 of varying sizes and environments.

FIGS. 2 and 3 provide more detailed schematic views of the conveyor assembly 48 that may be used to transport tubular elements 42. Some or all of the conveyor sections 50 may be coupled end to end via their frames 52. Although illustrated via dashed lines around the individual conveyor sections 50, the frames 52 may be a structure that is coupled to and extends lengthwise beyond the conveyor belts of the conveyor sections 50. These frames 52 may allow multiple conveyor sections 50 to be linked together and raised or lowered via a single hydraulic arm 70.

The conveyor assembly 48 (or positive drive pipe conveyor system) is a linear array of hydraulically powered conveyor sections 50. The conveyor assembly 48 may include a floor section 50A and an articulated base section 72. In the illustrated embodiment, the articulated base section 72 includes three separate conveyor sections 50B, 50C, and 50D. The floor section 50A is disposed on the rig floor 12, while the articulated base section 72 is located over the V-door 56 and the catwalk area 58.

The floor section 50A may be stationary with respect to the rig floor 12. During initial installment of the conveyor assembly 48, for example, the floor section 50A may be indexed into one or more mouseholes 80 of the rig floor 12, in order to maintain its stationary position. However, it should be noted that other methods may be employed to ensure that the floor section 50A is maintained in a stationary position on the rig floor 12. This stationary positioning of the floor section 50A may ensure that no large moving parts are present at the rig floor 12, where rig operators often are present and interacting with drilling equipment.

FIG. 2 shows the conveyor assembly 48 in a raised position and aligned orientation. In this raised position, all of the conveyor sections 50 are generally aligned with each other. As illustrated in FIG. 2, the conveyor sections 50 are all substantially aligned (within approximately 3 degrees) with an axis 82 that extends from the catwalk area 58 to the rig floor 12. In this aligned orientation, the conveyor belts on these conveyor sections 50 can rotate, all in the same direction, to move the tubular element 42 up or down the conveyor assembly 48. Since all of the conveyor sections 50 are aligned, the conveyor assembly 48 is able to move the tubular element 42 up or down without causing any relative axial movement of the tubular element 42 along its length. That is, all portions of the tubular element 42 are moved together at the same speed and in the same direction via the array of conveyor sections 50. This may prevent the application of undesirable strain on the tubular element 42 that could occur through the use of tension members (e.g., cables, wire ropes, basket winches, etc.) in laydown truck assemblies, which pull the tubular element 42 up to the rig floor, or through hydraulically actuated members of power catwalks, which push on one end the tubular element 42. In addition, there is no bending moment applied to the tubular element 42 moving across the aligned conveyor sections 50.

FIG. 3 shows the conveyor assembly 48 in a lowered position. In the lowered position, the conveyor sections 50 are not in alignment with each other. For example, the floor section 50A remains in its stationary position on the rig floor 12, the conveyor section 50B (e.g., articulated section) is disposed along the V-door 56, and the conveyor sections 50C and 50D (e.g., base sections) are disposed on and aligned with the horizontal catwalk area 58. In this unaligned orientation, the tubular element 42 (or other piece of drilling equipment) may be loaded from a pipe rack or some other portion of the catwalk area 58 onto the horizontally aligned base conveyor sections 50C and 50D.

As noted above, the conveyor assembly 48 includes the frame actuation assembly 54 to transition the conveyor sections 50B, 50C, and 50D between the aligned orientation (e.g., FIG. 2) and the unaligned orientation (e.g., FIG. 3). In the illustrated embodiment, the frame actuation assembly 54 is an assembly of linkages that includes the main hydraulic arm 70 and a tail-lift linkage 84. The hydraulic arm 70 may be coupled between the ground surface 46 (or the catwalk area 58) and a position along the series of conveyor sections 50. In the illustrated embodiment, for example, the hydraulic arm 70 is coupled to a juncture of the frames 52 of two adjacent conveyor sections 50B and 50C. In this way, the conveyor assembly 48 may be lifted by the hydraulic arm 70 at a position between the conveyor sections 50B and 50C over the V-door 56 and the catwalk area 58, respectively.

It should be noted that other arrangements of the frame actuation assembly 54 may be utilized as well. For example, the hydraulic arm 70 may be disposed between the ground surface 46 and a position along the conveyor sections 50 that is closer to or further from the rig floor 12. In other embodiments, the frame actuation assembly 54 may include two or more hydraulic arms 70 that are hydraulically actuated to raise different portions of the conveyor assembly 48. However, it should be noted that, by using a single hydraulic arm 70 as illustrated, the conveyor assembly 48 may utilize simpler controls and fewer hydraulic fluid hoses for actuating the system. This may allow for a conveyor assembly 48 that is more portable and relatively easy to set up, as compared to traditional power catwalks that require more bulky and complicated assemblies. In addition, the disclosed conveyor assembly 48 does not include any telescoping features, which can be large and relatively complicated and rely on several separate hydraulic hoses and electrical controls. In the illustrated embodiment, all of the conveyor sections 50 are separately positioned and arranged for relatively quick and simple maneuvering between the unaligned and aligned orientations.

As illustrated in FIG. 2, the main hydraulic arm 70 may be configured to rotate upward about a pivot point 86, as shown by arrow 88. This rotation of the hydraulic arm 70 pushes the conveyor sections 50B, 50C, and 50D upward until they reach the aligned orientation. In some embodiments, the hydraulic arm 70 may be a two-stage arm that rotates about the pivot point 86 and extends along its length to raise the conveyor assembly 48. The tail-lift linkage 84 may be coupled to a lower end of the last conveyor section 50D, as illustrated. In some embodiments, the tail-lift linkage 84 is configured to freely rotate relative to a pivot point 90, as shown by arrow 92, thereby allowing the conveyor section 50D to lift off of the catwalk area 58 as the hydraulic arm 70 lifts the entire assembly. Other embodiments may not utilize a tail-lift linkage 84, but instead may allow the lower end of the conveyor section 50D to rest on or remain proximate the catwalk area 58 as the hydraulic arm 70 lifts the conveyor assembly 48. Other combinations or arrangements of hydraulic lifting arms and freely-rotating support linkages may be utilized in the frame actuation assembly to transition the conveyor assembly 48 between aligned and unaligned orientations.

At both the lowered (unaligned) position and the raised (aligned) position, the conveyor sections 50 are rigidly held together via the frames 52. As the frame actuation assembly 54 moves the frames 52 relative to one another, the position of the conveyor sections 50 may remain fixed within the respective frames 52. In other embodiments, however, the conveyor sections 50 may be configured to rock slightly within the frames 52 to accommodate the tubular element 42 as it is passed from one conveyor section 50 to the next. The conveyor belts may move relative to the conveyor sections 50, even as the conveyor sections 50 do not move relative to the frames 52 that are lifting and lowering the conveyor sections 50. Raising and lowering the frames 52 may be controlled independently from the rotation of the conveyor belts. In some embodiments, the conveyor assembly 48 may be designed such that all of the belts around the different conveyor sections 50 rotate at the same time and at the same speed. That way, the tubular element 42 rides up or down the conveyor assembly 48 without any interruptions. Equipment and methods for controlling this coordinated movement of the conveyor sections 50 is described in detail below.

Since the articulated base section 72 of the conveyor assembly 48 moves while the floor section 50A remains stationary, the floor section 50A may be an entirely separate piece from the rest of the conveyor assembly 48. That is, the framework that is used to connect and enable relative movement of the conveyor sections 50B, 50C, and 50D may not be coupled to the floor section 50A in some embodiments. Instead, the upper end of the closest conveyor section 50B to the floor section 50A may be coupled to or may rest atop the V-door 56. In other embodiments, all of the conveyor sections 50, including the floor section 50A, may be coupled end to end via the frames 52.

The conveyor assembly 48 may include certain features that aid in the manipulation of tubular elements 42 onto and off of the conveyor assembly 48. For example, the stationary floor section 50A may be configured to freewheel, allowing the concurrent operation of the conveyor assembly 48 and equipment on or above the rig floor 12. The term "freewheel" means that the floor section 50A may be placed into neutral, such that the tracks of the conveyor belt can move around the outer edge of the floor section 50A when acted on by an outside force. With the floor section 50A in neutral, the tubular element 42 may be pulled off or inserted onto the conveyor assembly 48 via elevators (not shown) hanging from the traveling block 22 or top drive 28. This may allow drilling operators on the rig floor 12 to more easily adjust the position of the tubular element 42 for making up or breaking connections at the rig floor 12.

In addition, the opposite end sections (e.g., floor section 50A and base section 50D) of the conveyor assembly 48 may include automatic mechanical devices for over-travel control. That is, the ends may be equipped with simple mechanical assemblies configured to automatically slow the speed of the conveyor belt in response to an end of the tubular element 42 extending beyond a certain point. This may help to stop the tubular during its ascent or descent along the conveyor assembly 48 in a simply controlled and automatic manner. Such cushioned stop devices are described in greater detail below, although more sophisticated control systems may be utilized in other embodiments.

Further, the base sections 50C and 50D along the catwalk area may be configured to accept and eject tubular elements 42 in different ways. More specifically, the conveyor sections 50C and 50D may be able to accept and eject tubular elements 42 laterally from a pipe rack disposed alongside the conveyor sections 50C and 50D. The pipe rack, or some other tubular handling structure, may be disposed adjacent and substantially parallel to (e.g., within 10 degrees of) the conveyor sections 50C and 50D. In addition, the conveyor section 50D is configured to accept and eject tubular elements 42 axially from an end 94 at the catwalk area 58 opposite the V-door 56. Existing laydown trucks and power catwalks typically do not allow for the reception and disposal of tubular elements 42 out the end 94. This provision of the conveyor assembly 48 to receive and eject tubular elements 42 from both the side and the end 94 makes the conveyor assembly 48 more flexible and adaptable to a desired catwalk arrangement of the drilling rig 10.

The conveyor assembly 48 may be particularly adaptable to different drilling rig configurations, including differently dimensioned rigs. The simplified mechanical controls, lifting arms, and overall framework allow for a relatively lightweight and portable conveyor assembly 48. The same conveyor assembly 48 may be transported between different drilling rigs 10 to be used to transport tubular elements 42 and other drilling equipment to and from the rig floor 12.

To accommodate different drilling rigs 10, the conveyor assembly 48 may be configured with any number of conveyor sections 50. FIGS. 4 and 5 illustrate conveyor assemblies 48 with four and five conveyor sections 50, respectively. Since the rig floor 12 is higher in the embodiment of FIG. 5, the V-door 56 is longer and two conveyor sections 50 are disposed across the V-door 56. This is in contrast to the embodiment of FIG. 4, where a single conveyor section 50 is disposed across the shorter V-door 56. In some embodiments, the same conveyor assembly 48 may be configured for use with either of the illustrated drilling rigs 10. To that end, the conveyor assembly 48 may include a linear array of conveyor sections 50 that allows for individual conveyor sections 50 to be attached or removed therefrom in a modular fashion. In addition, the height to which the lifting arm 70 is configured to raise the conveyor assembly 48 may be adjusted. In this way, the conveyor assembly 48 may be tailored to an appropriate length and height for any particular drilling rig 10.

Having now discussed the overall structure of the conveyor assembly 48, a detailed description of an individual conveyor section 50 is provided. FIG. 6 illustrates an embodiment of the conveyor section 50, without the frame 52 for coupling this conveyor section 50 to adjacent conveyor sections. The conveyor section 50 includes a track or belt 110 disposed around an outer edge of the conveyor section 50. The belt 110 features treads that are configured to be in direct contact with the tubular element 42 while transporting the tubular along an upper portion 112 of the conveyor section 50. The belt 110 is rotated around a sprocket 114 disposed at one end of the conveyor section 50. At the other end is an idler wheel 115 of approximately the same size as the sprocket 114. The sprocket 114 has teeth that latch securely within a slot formed along an inner edge of the belt 110 so that the belt 110 does not come off of the conveyor section 50. The sprocket 114 is turned via a hydraulic pump motor for the conveyor section 50 in order to urge rotation of the belt 110.

In the illustrated embodiment, the conveyor section 50 features an upside down skid steer loader arrangement for moving the belt 110. That is, the larger sprocket 114 and idler wheel 115 are positioned relatively low in the assembly, and a series of relatively smaller rollers 116 are disposed at a portion of the conveyor section 50 that reaches above the sprocket 114. These rollers 116 may be passive rollers that provide additional support with low friction to the upper portion 112 of the conveyor section 50, where the belt 110 is in direct contact with the tubular element 42. This arrangement may facilitate a center of gravity 118 of the conveyor section 50 that is lower than a midpoint between the upper portion 112 and an opposite lower portion 120 of the conveyor section 50.

As mentioned above, it may be desirable for the conveyor section 50 to be able to rock slightly, allowing the tubular element 42 to more smoothly transition from one conveyor section 50 to the next. To accommodate this rocking, the conveyor section 50 may be coupled to the frame 52 (not shown in this illustration) via a rotating joint, such as a pin connection. The pin boss 122 (or pin, depending on the pin joint arrangement) of the conveyor section 50 may be located at a connection point 124 centered along a length 126 of the conveyor section 50 and above the center of gravity 118. The conveyor section 50 also may include stops 128 disposed toward both ends of the conveyor section 50 and configured to engage with a complementary portion of the frame 52. These stops 128 may stop the rotation of the conveyor section 50 relative to the frame 52 at a desired orientation. For example, the stops 128 may limit the movement of the conveyor section 50 to approximately 3 degrees from the plane of the corresponding frame 52 on either side (e.g., 6 degree total maximum tilt).

It should be noted that other arrangements of the individual conveyor sections 50 may be utilized in other embodiments. That is, some embodiments may not include additional rollers 116 between the sprocket 114 and the idler wheel 115, and other embodiments may include more than one sprocket 114 or more than one idler wheel 115 around which the belt 110 is rotated. Still further, some embodiments may use a different type of connection (e.g., rigid connection) to couple the conveyor section 50 to the frame 52 so that no rotation is permitted about the connection point 124.

It may be desirable for the conveyor sections 50 to conform to certain dimensions. In some embodiments, for example, the overall axial length 126 of the conveyor section 50 may be approximately 6 to 8 feet. The length 126 of the conveyor section 50 may be long enough to support a portion of the tubular element 42 (which may be approximately 30 to 33 feet in length, but short enough to be easily transportable and adaptable to different rig sizes, as described above with reference to FIGS. 4 and 5. It may be desirable for all of the conveyor sections 50 that make up the conveyor assembly 48 to be approximately the same length 126. In some embodiments, the rollers 116 on the conveyor section 50 may be positioned such that they raise the belt 110 approximately an additional 0.5 to 2 inches in height 130 above the sprocket 114.

As shown in FIGS. 7 and 8, the belt 110 used to move the tubular element 42 along the upper portion 112 of the conveyor sections 50 may include treads 150 that are cut in a certain shape. More specifically, the treads 150 may be cut with a concave profile 152 for receiving and maintaining the tubular element 42 in a center portion 154 of the belt 110. The treads 150 dip lower at this center portion 154, and the tubular element 42 is able to rest in this dip so that, as the tubular element 42 travels up and down the conveyor assembly 48, the tubular element 42 remains centered atop the conveyor belt 110. Thus, the treads 150 grip the tubular element 42 and prevent it from falling from the conveyor assembly 48. Using these treads 150, the belt 110 may be capable of handling tubular elements 42 of between approximately 1 inch to 20 inches in diameter with limited or no adjustments to the conveyor assembly 48.

Figure 9:
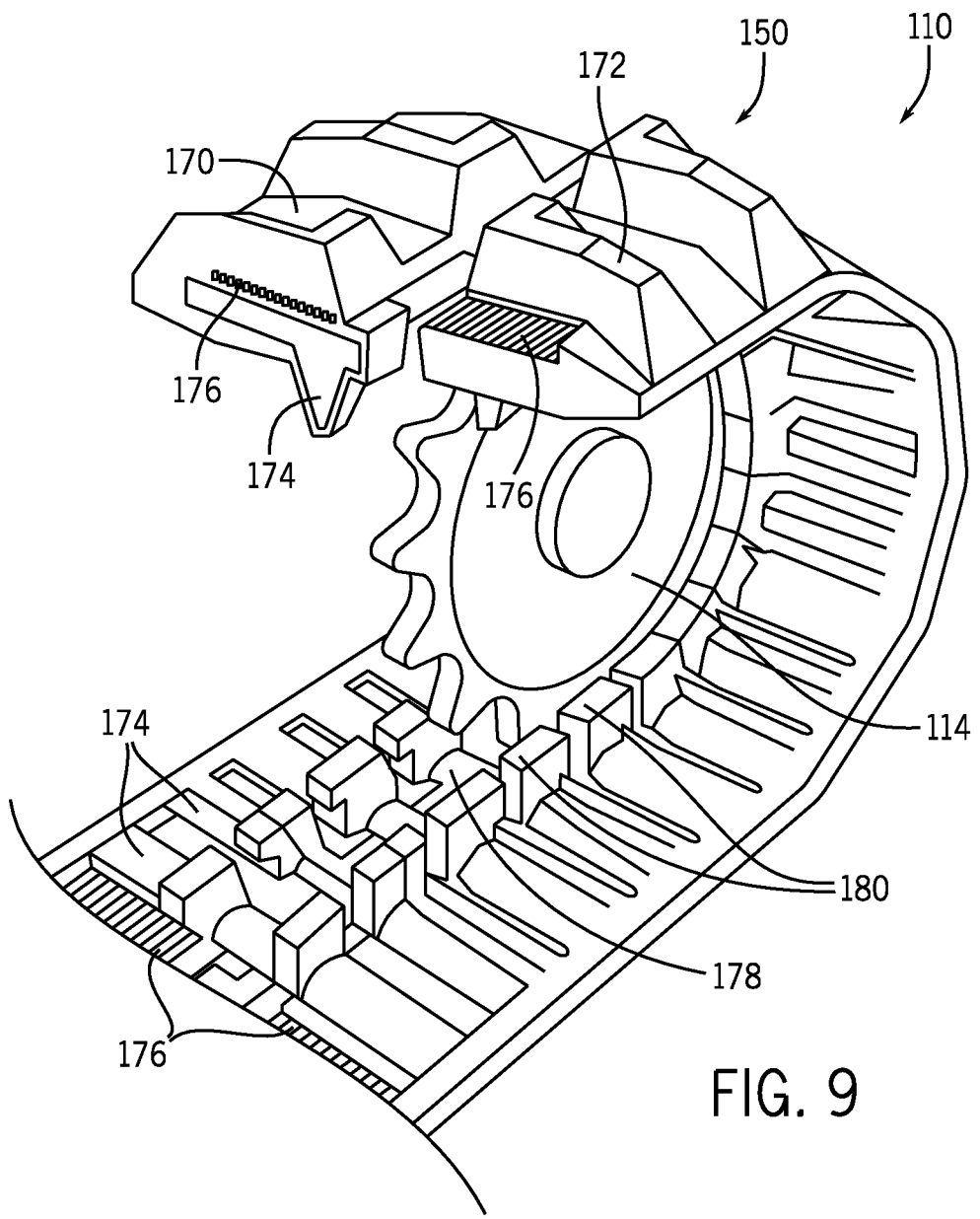
FIG. 9 is a perspective cutaway view of treads and a sprocket of the conveyor section of FIG. 6 in accordance with an embodiment of the present techniques.

A more detailed cutaway view of the treads 150 and the interface between the sprocket 114 and the belt 110 are illustrated in FIG. 9. The treads 150 may be largely made from rubber 170, with alternating rubber lugs 172 extending upward along the belt 110. In addition, the belt 110 may include a metal core 174 that provides stiffness to the rubber sections. Still further, the belt 110 may include steel cord 176 embedded within the rubber track to provide additional strength without adding substantial weight.

The rubber 170 used in the belt 110 may include a mixture of natural and synthetic rubbers. This particular type of blend may offer desirable anti-abrasive properties, as well as improved flexibility to different weather conditions, as opposed to an all-natural or all-synthetic rubber. In a swampy region, for example, the rubber 170 may be able to grip the tubular elements 42 without swampy soil adhering to the treads 150 of the belt 110. The same mixed rubber 170 may minimize an amount of noise and vibrations that occur in dryer climates. Thus, the mixture of natural and synthetic rubbers may provide desirable characteristics that can be applied within a variety of climates and drilling environments, making the conveyor assembly 48 adaptable to a wide range of drilling rigs 10.

The metal core 174 adds structure to the inner surface of the belt 110. Specifically, the metal core 174 defines sprocket holes 178, which the teeth of the sprocket 114 engage as the sprocket 114 turns the belt 110. The metal core 174 includes wheel guide projections 180 along each side of the sprocket holes 178, and these wheel guide projections 180 are designed to enclose the path of the sprocket 114. Thus, the metal core 174 effectively attaches the belt 110 to the sprocket 114 via the sprocket holes 178 and wheel guide projections 180, keeping the belt 110 from slipping off the sprocket 114. During assembly of the belt 110, an adhesive treatment may be utilized to firmly bond the metal core 174 to the rubber 170. As noted above, the steel cord 176 is disposed in the rubber 170 to increase the strength of the belt 110 at desired locations. Considering both the machine weight and the loading weight of the tubular elements 42 and other drilling equipment, a desired number and strength of steel cords 176 may be inserted into the rubber 170.

Through the use of the mixed rubber tread 150, reinforced by the steel cord 176 and aligned with the sprocket 114 via the metal core 174, the belt 110 may provide an increased grip on the tubular element 42, low vibration and noise, and a reduced weight of the conveyor assembly 48, without damaging the tubular elements 42. In addition, with the concave tread 150, the belt 110 may be able to handle relatively exotic tubular elements 42. The term "exotic" may refer to tubular elements 42 that are different than steel drillpipe, drill collar, or casing. For example, the belt 110 may be capable of transporting irregular shaped, chrome, alloy, flush joint, or other types of tubular that would otherwise be difficult to convey up a power catwalk.

The concave treads 150 may also allow the belt 110 to transport drillpipe or other tubular elements 42 up and down the conveyor assembly 48 without thread protectors being disposed on the ends of the tubular. Such thread protectors are typically disposed on the tubular elements 42 that are being transported up power catwalks and/or laydown trucks, in order to keep the threads at the ends of the tubular element 42 from becoming deformed or damaged during transportation of the tubular to and from the rig floor 12. The disclosed conveyor assembly 48, however, may apply less force to the boxes, pins, or threads at the ends of the tubular element 42, due to the compliant nature of the rubber treads 150. Thus, the thread protectors can be removed from, or installed onto, the tubular element 42 along the catwalk area 58 instead of at the rig floor 12. This may simplify and streamline the tasks of connecting and lifting the tubular element 42 at the rig floor 12.

Figure 10:
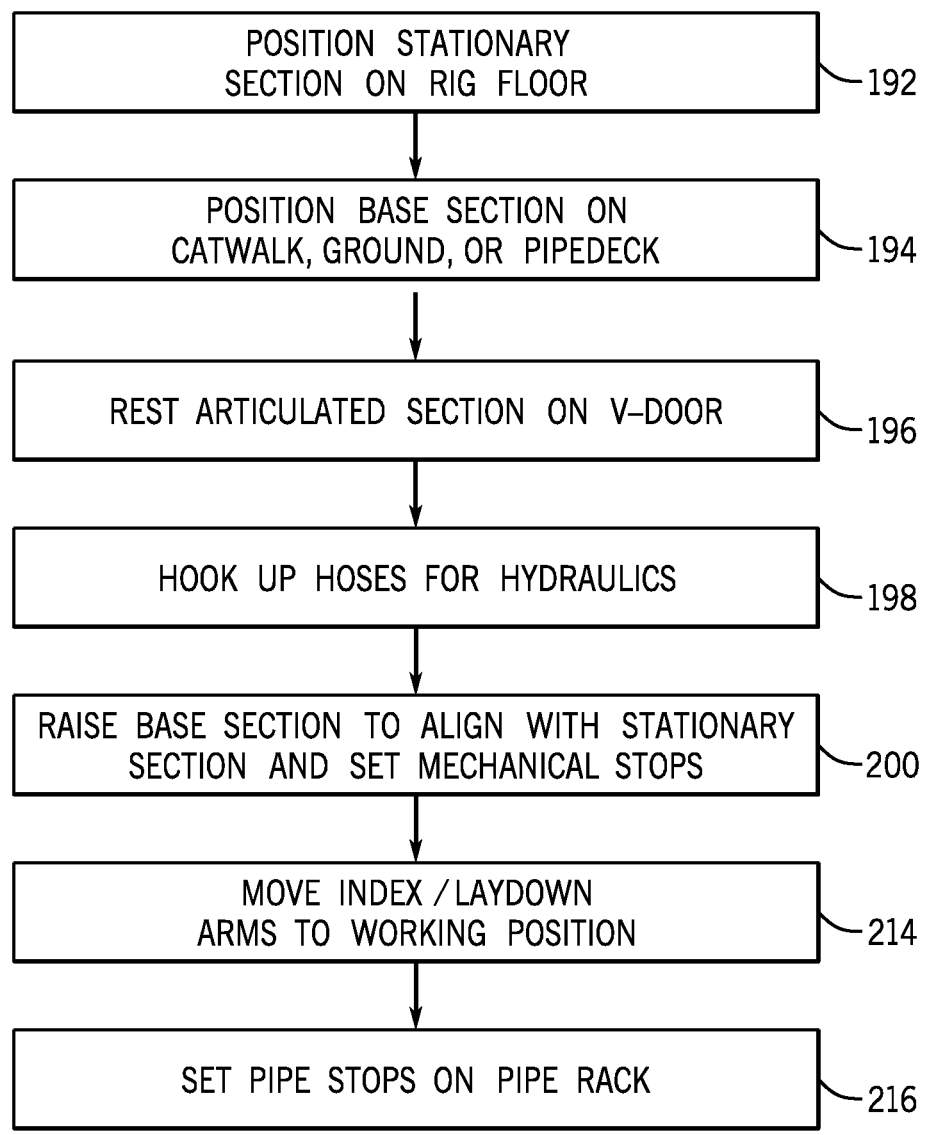
FIG. 10 is a process flow diagram of a method for configuring the articulated conveyor assembly of FIG. 2 to a specific drilling rig in accordance with an embodiment of the present techniques.

Having now discussed in detail certain components of the disclosed conveyor assembly 48, a description of various rig operations related to the conveyor assembly 48 are provided. These operations may include rig up operations for preparing the drilling rig 10 and, in particular, the conveyor assembly 48 for receiving and transitioning tubular elements 42. FIG. 10 illustrates a method 190 for rigging up the conveyor assembly 48 in accordance with an embodiment of the present disclosure. It should be noted that in some embodiments steps of the method 190 may be performed in different orders than those shown, or omitted altogether. In addition, some of the blocks illustrated may be performed in combination with each other.

In the illustrated embodiment, the method 190 includes positioning (block 192) the stationary floor section 50A on the rig floor 12. This may involve indexing the floor section 50A in the mousehole 80, as discussed above, although other methods of fixing the floor section 50A to the rig floor 12 may be utilized. The method 190 also includes positioning (block 194) the base section (e.g., conveyor sections 50C and 50D) on the catwalk area 58, the ground, or a pipe deck from which the tubular elements 42 are loaded onto the conveyor sections 50C and 50D. In this position, the articulated conveyor section 50B may be resting (block 196) on the V-door 56, as illustrated in FIG. 3. The method 190 may include hooking up (block 198) hoses for the hydraulics of the conveyor assembly 48. These hoses may deliver hydraulic fluid from a hydraulic unit on the rig floor 12 or at a position near the ground surface 46 to the hydraulic pumps that rotate the belts 110 within each conveyor section 50 and to the frame actuation assembly 54 for raising and lowering the conveyor assembly 48.

Figure 11:
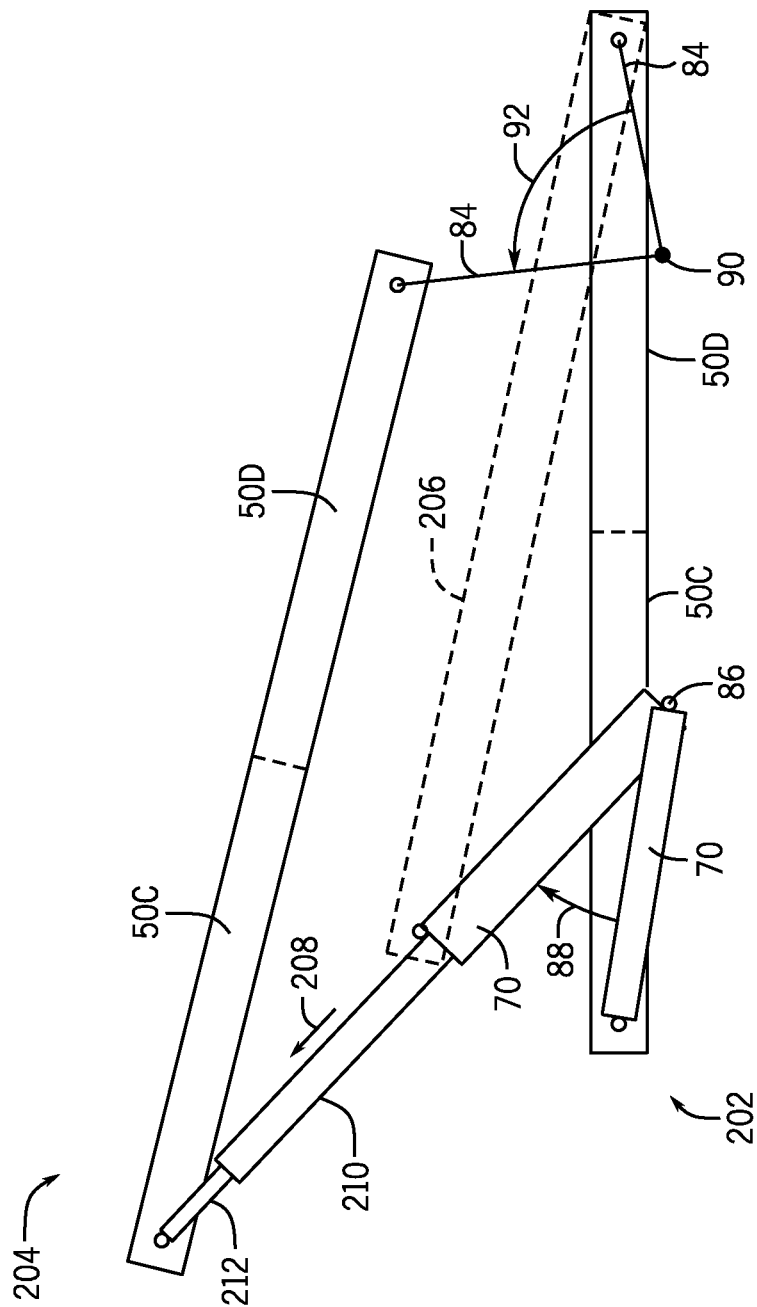
FIG. 11 is a schematic representation of a two-stage arm assembly for raising and lowering sections of the articulated conveyor assembly of FIG. 2 in accordance with an embodiment of the present techniques.

To set the raised position of the conveyor assembly 48, the method 190 includes raising (200) the base conveyor sections 50C and 50D to align these conveyor sections 50C and 50D with the stationary floor section 50A. The conveyor section 50B rises automatically with the conveyor sections 50C and 50D, since the frames 52 of these conveyor sections are coupled together end to end. The frame actuation assembly 54 may raise the conveyor assembly 48 via the hydraulic arm 70. As mentioned above, the hydraulic arm 70 may be a two-stage hydraulic arm, as shown in FIG. 11. In this illustrated embodiment, the hydraulic arm 70 operates in two separate stages to lift the illustrated conveyor section (e.g., combined sections 50C and 50D) from a lowered position 202 to a raised position 204. The first stage of this actuation may involve a rotation of the hydraulic arm 70 relative to the pivot point 86. At this point, the conveyor sections 50C and 50D are in an intermediate position between the lowered position 202 and the raised position 204, as generally indicated by reference numeral 206. From here, the second stage of hydraulic actuation may involve extension of the hydraulic arm 70 along its longitudinal axis, as illustrated by an arrow 208 and telescoping hydraulic arm segments 210 and 212. The tail-lift linkage 84 rotates in response to the lifting action of the hydraulic arm 70 during this second stage. It should be noted that in other embodiments, the hydraulic arm 70 may include any desired number of stages to reach the desired height and angle for the articulated sections of the conveyor assembly 48.

Once all of the conveyor sections 50 are in alignment, the method 190 includes setting (block 200) mechanical stops of the conveyor assembly 48 such that the conveyor sections 50B, 50C, and 50D are prevented from moving above or rotating beyond this aligned orientation. These mechanical stops may be parts of the frame actuation assembly 54 that halt the motion of the hydraulic arm 70 at a certain extension. When aligning the articulated conveyor sections 50B, 50C, and 50D with the floor section 50A, the ends of the adjacent conveyor sections do not have to be at a fixed distance apart from each other. For example, the ends of the conveyor sections 50 may be spaced apart by any distance within a range of approximately 1 inch to 10 feet. Indeed, when the same conveyor assembly 48 is positioned and used with different drilling rigs 10, the spacing between the conveyor sections 50 in the aligned orientation may be different from one rig to another. Depending on the elevation of the conveyor sections 50B, 50C, and 50D via the frame actuation assembly 54, the tail-lift linkage 84 may be utilized to provide additional support for the raised conveyor assembly 48. As discussed above, the tail-lift linkage 84 is configured to rotate passively in response to the raised conveyor section 50D. A mechanical stop may be set for this tail-lift linkage 84 as well.

If the first operation of the conveyor assembly 48 will be picking up and transporting tubular elements 42 from the catwalk area 58 to the rig floor 12, the method 190 may include moving (block 214) index/lay-down arms from a transport position to a working position and setting (block 216) pipe stops on a pipe rack. The index/lay-down arms may be positioned on the catwalk area 58 and are used to move a single tubular element 42 from a pipe rack to the conveyor sections 50C and 50D. The pipe stops on the pipe rack may keep the tubular elements 42 from rolling off the pipe rack prior to being removed via the index/lay-down arms.

This method 190 of setting up the conveyor assembly 48 on a particular drilling rig 10 enables the conveyor assembly 48 to be easily adapted to a variety of different rigs. For example, the conveyor assembly 48 adapts easily to many configurations of the V-door 56, substructure, mast, rig floor 12, catwalk area 58, and so forth. In addition, the conveyor assembly 48 may be configurable for use on all types of rigs, including those on land and those offshore.

Once set up as described in the method 190, the conveyor assembly 48 may be ready for operation to move tubular elements 42 up or down the conveyor sections 50. In some embodiments, however, it may be desirable to move the conveyor assembly 48 out of the way of the V-door 56 so that other piece of drilling equipment (e.g., larger equipment that cannot be handled by the conveyor assembly 48) can be hoisted up the V-door 56 to the rig floor 12. The relatively lightweight conveyor assembly 48 may be moved away from the V-door 56 to allow space for moving such equipment. In some embodiments, the stops and other components of the frame actuation assembly 54 may remain fixed as the conveyor assembly 48 is moved, thus enabling the conveyor assembly 48 to be easily repositioned and configured for operation after the drilling equipment is lifted up the V-door 56.

Figure 12:
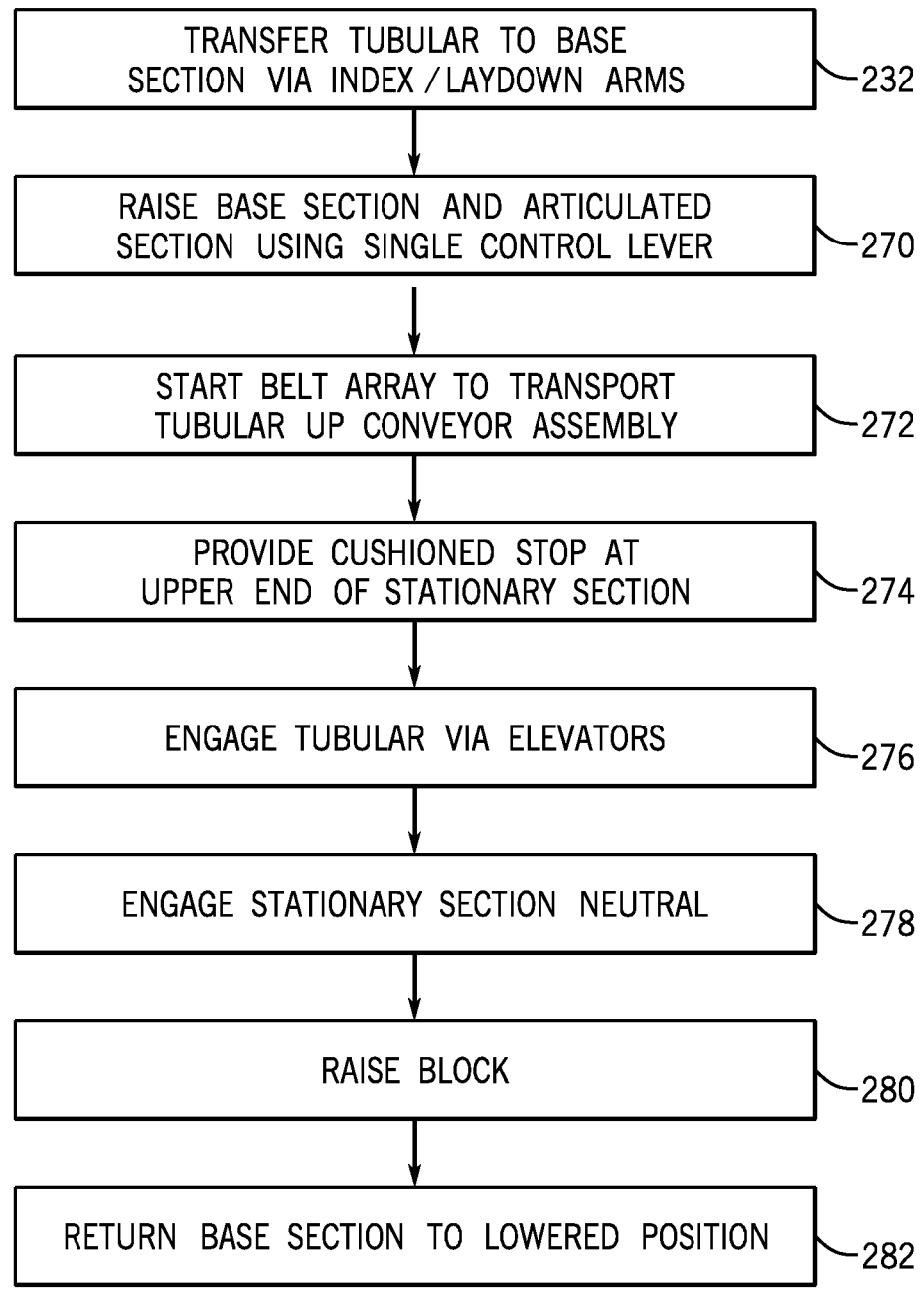
FIG. 12 is a process flow diagram of a method for transporting a length of tubular from a position near the ground to a position atop the rig floor via the articulated conveyor assembly of FIG. 2 in accordance with an embodiment of the present techniques.

Once set up is complete, the conveyor assembly 48 may perform pickup operations for moving the tubular elements 42 from an area near the ground surface 46 or the catwalk area 58 to the rig floor 12. Once at the rig floor 12, the tubular elements 42 may be added to the tubular string 32 and run into the wellbore 34 one at a time. FIG. 12 illustrates an embodiment of a method 230 for picking up and transporting tubular elements 42 to the rig floor 12. It should be noted that in some embodiments steps of the method 230 may be performed in different orders than those shown, or omitted altogether. In addition, some of the blocks illustrated may be performed in combination with each other.

As noted above, some embodiments of the conveyor assembly 48 may work in conjunction with index/laydown arms. In such embodiments, the method 230 may include transferring (block 232) the tubular element 42 to a base section (e.g., sections 50C and 50D) of the conveyor assembly 48 via the index/laydown arms. An embodiment of index/laydown arms 240 is provided in FIG. 13. The index/laydown arms 240 may load a single tubular element 42 from the pipe rack 242 onto the belt 110 of the conveyor sections 50C and 50D at the base of the conveyor assembly 48. The illustrated index/laydown arms 240 include an engagement feature 244 and a lifting feature 246 rotatably coupled at a pivot point 248. The lifting feature 246 may be actuated via a single piston 250. Initially, the lifting feature 246 may be hanging low from a pin 252, and the engagement feature 244 may be approximately aligned with the lifting feature 246. The index/laydown arms 240 may be configured such that the engagement feature 244 cannot rotate beyond this aligned position relative to the lifting feature 246 in a certain direction (e.g., counterclockwise). Thus, as the piston 250 forces the lifting feature 246 upward, the engagement feature 244 remains aligned with the lifting feature 246.

Figure 13:
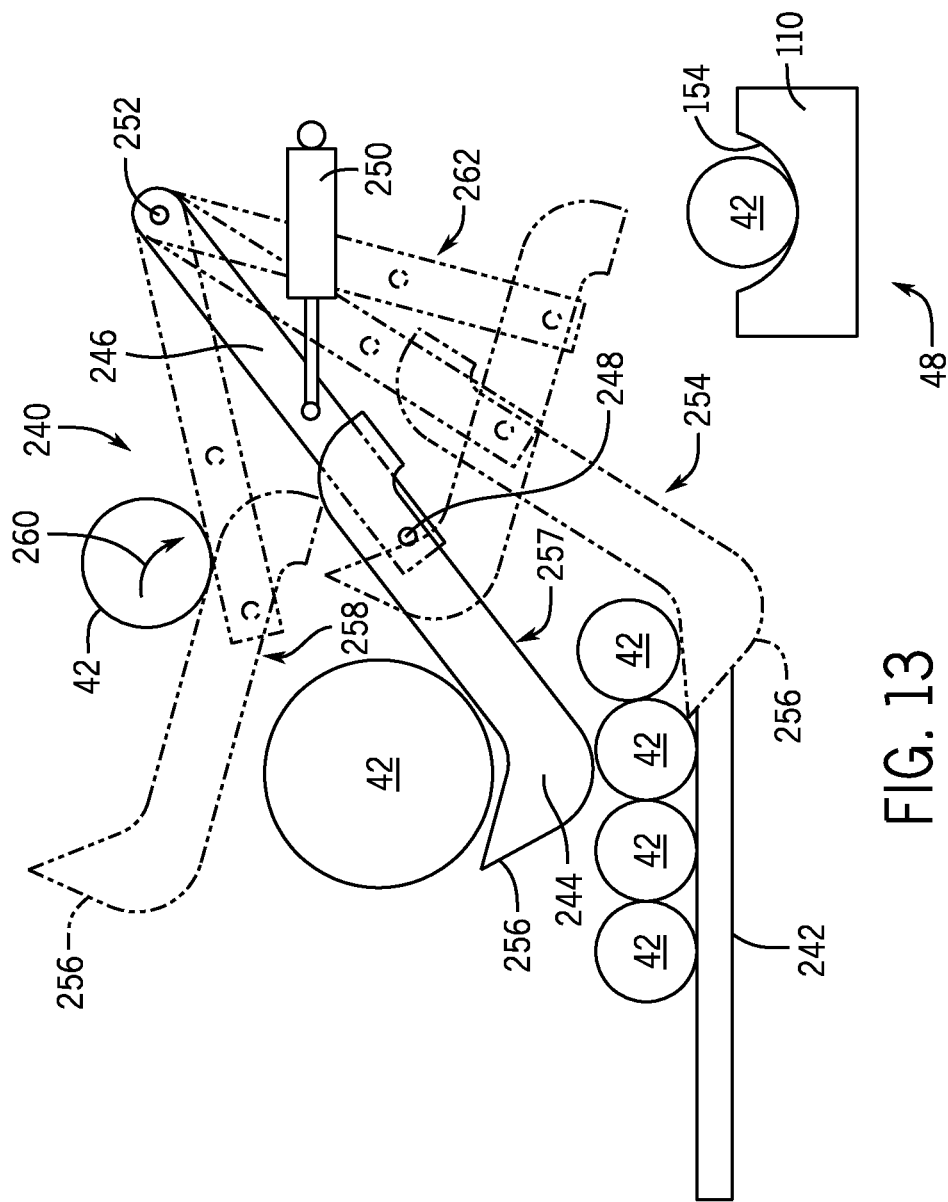
FIG. 13 is a schematic view of index/laydown arms used to transfer tubular from a pipe rack to the articulated conveyor assembly of FIG. 2 in accordance with an embodiment of the present techniques.

FIG. 13 shows a single set of index/laydown arms 240 being actuated through a cycle of positions for transporting the tubular element 42 onto the conveyor assembly 48. In a first position indicated by reference numeral 254, the actuated lifting feature 246 brings the engagement feature 244 into contact with a tubular element 42 at the end of the pipe rack 242. From here, a scoop end 256 of the engagement feature 244 may capture the tubular element 42 as the lifting feature 246 raises the engagement feature 244 upwards. In a second position indicated by reference numeral 257, the tubular element 42 is resting on the scoop 256 of the engagement feature 244 as the lifting features 246 continues to raise the engagement feature 244. In a third position indicated by reference numeral 258, the lifting feature 246 and engagement feature 244 are raised and rotated far enough with respect to the pin 252 that the tubular element 42 begins to roll down the engagement feature 244. This movement of the tubular element 42, indicated by arrow 260, may cause the engagement feature 244 to rotate about the pivot point 248 (e.g., in a clockwise direction). As the engagement feature 244 tilts toward the conveyor assembly 48, the tubular element 42 continues to roll and drop into the trough (e.g., center portion 154) of the belt 110, ready to be moved up the conveyor assembly 48.

As the tubular element 42 continues to roll off the engagement feature 244 in the manner described above, the engagement feature 244 may automatically lock into an unaligned position relative to the lifting feature 246. As illustrated, the engagement feature 244 may be locked into a position that is approximately (e.g., within ten degrees) perpendicular to the lifting arm 246. Locked in this position, the index/laydown arms 240 may be lowered fully, the engagement feature 244 passing the next tubular element 42 in line on the pipe rack 242. The index/laydown arms 240 following this return path are indicated by reference numeral 262. Gravity or a control mechanism may reset the engagement feature 244 into the aligned position 254, in order to capture the next tubular element 42 as it is raised. The illustrated embodiment of index/laydown arms 240 may be utilized with a range of different sizes and types of tubular elements 42, and so may be used in a wide variety of rig operations along with the conveyor assembly 48. In addition, the relatively simple controls used to raise and lower the index/laydown arms 240 may keep the assembly relatively lightweight for easy transportation and setup.

In some embodiments, the index/laydown arms 240 may be configured to accept or reject tubular elements 42 from the pipe rack 242. That is, if a tubular element 42 at the end of the pipe rack 242 is identified as unsatisfactory (e.g., tubular element 42 is damaged or is the wrong type), the index/laydown arms 240 may be controlled to place the tubular element 42 into a location away from the conveyor assembly 48. More specifically, the index/laydown arms 240 may be placed in the first position 254 to engage the next tubular element 42 on the pipe rack 242. If the tubular 42 is determined to be unfit for use on the drilling rig 10, the piston 250 may be controlled to lower the lifting feature 246 and the engagement feature 244, dropping the tubular element 42 into a location away from the conveyor assembly 48 (e.g., a lower shelf of the pipe rack 242). This may enable the index/laydown arms 240 to accept or reject tubular elements 42 as desired without having to reconfigure or cease operations of the index/laydown arms 240.

Returning now to FIG. 12, the method 230 includes raising (block 270) the base section (e.g., conveyor sections 50C and 50D) and the articulated section (e.g., conveyor section 50B) in response to a single control lever. Since the stops have already been set during the initial setup of the conveyor assembly 48, the control lever may initiate actuation of the hydraulic arm 70, which will continue until it reaches the preset angle and elevation. As discussed above with reference to FIGS. 2 and 3, the conveyor section 50B may ride up the V-door 56 as the conveyor sections 50C and 50D are lifted, until all the conveyor sections 50B, 50C, and 50D align. Once in alignment with each other, the conveyor sections 50B, 50C, and 50D may be lifted together via the hydraulic arm 70 until they are in alignment with the floor section 50A. The control lever that initiates this lifting movement of the conveyor assembly 48 may remain held down or be released when the conveyor sections 50 reach the aligned orientation.

The method 230 includes starting (block 272) the rotation of the belt array to transport the tubular element 42 up the conveyor assembly 48. The belts 110 on all of the conveyor sections 50 are configured to rotate about their perimeters at approximately the same speed. The tubular element 42 travels up the conveyor sections 50 as the belts 110 rotate. In some embodiments, the method 230 may include providing (block 274) a cushioned stop to the tubular element 42 as it reaches the upper end of the stationary floor section 50A. In some embodiments, the box (e.g., threaded end) of the tubular element 42 may trip the "stop" mechanism that slows the rotation of the belt 110. The tubular element 42 may continue to move beyond the end of the floor section 50A another 2.5 feet, decelerate, and stop with the box up to approximately 3 feet beyond the end of the floor section 50A. Specific mechanisms for providing this cushioned stop are discussed in detail below.

The method 230 may also include engaging (block 276) the tubular element 42 via elevators at the rig floor 12. The elevators may be a pair of hydraulically actuated arms that are rotatably coupled to the top drive 28 and used to grip and pull the tubular element 42 into alignment and engagement with the quill 30 of the top drive 28. The elevators are able to pivot relative to the top drive 28 in order to align the gripping mechanism of the elevators with the angled tubular element 42 extending from the floor section 50A. The method 230 may include engaging (block 278) a neutral control of the stationary floor section 50A. As discussed above, the floor section 50A may be placed in neutral so that the tubular element 42 can be moved along with the belt 110 of the floor section 50A in response to a force on the tubular element 42. To that end, the method 230 may include raising (280) the traveling block 22 and, consequently, the top drive 28, elevators, and tubular element 42 coupled thereto. The tubular element 42 may easily roll off the floor section 50A as it is lifted. In addition, the method 230 includes returning (block 282) the base and articulated sections (e.g., conveyor sections 50B, 50C, and 50D) to the lowered position shown in FIG. 3. In some embodiments, this lowering of the conveyor assembly 48 may be performed concurrently with the raising of the traveling block and the tubular element 42.

As the traveling block 22 continues to be raised, the pin (e.g., end opposite the box) of the tubular element 42 follows the trough profile of the floor section 50A. As noted above, the floor section 50A may be in neutral so that the tubular element 42 rolls the belt 110 of the floor section 50A without any relative movement between them. The tubular element 42 may then swing over the stump 40 at the rig floor 12 upon exiting the floor section 50A, and at this point the neutral of the floor section 50A may be disengaged. From this position, crew members on the rig floor 12 can make up the tubular element 42 with the stump 40, remove the slips 36, and run in the new length of tubular to add to the tubular string 32. While this is happening on the rig floor, the index/laydown arms 240 may load the next tubular element 42 onto the base sections 50C and 50D of the conveyor assembly 48.

It should be noted that, during this process, there are no large components moving on the rig floor 12 except the tubular element 42. Any movement occurring among components of the conveyor assembly 48 are happening below the rig floor 12, and the floor section 50A of the conveyor assembly 48 is always stationary. This may prevent collisions of costly equipment on the rig floor 12 and increase efficiency of the overall rig up process without complicating events at the rig floor 12. When the rig crew is ready for the next tubular element 42, the conveyor assembly 48 is lifted and the belt array is actuated to bring the next length of tubular up to the rig floor 12. This process can be repeated until the pick up operations are complete.

Figure 14:
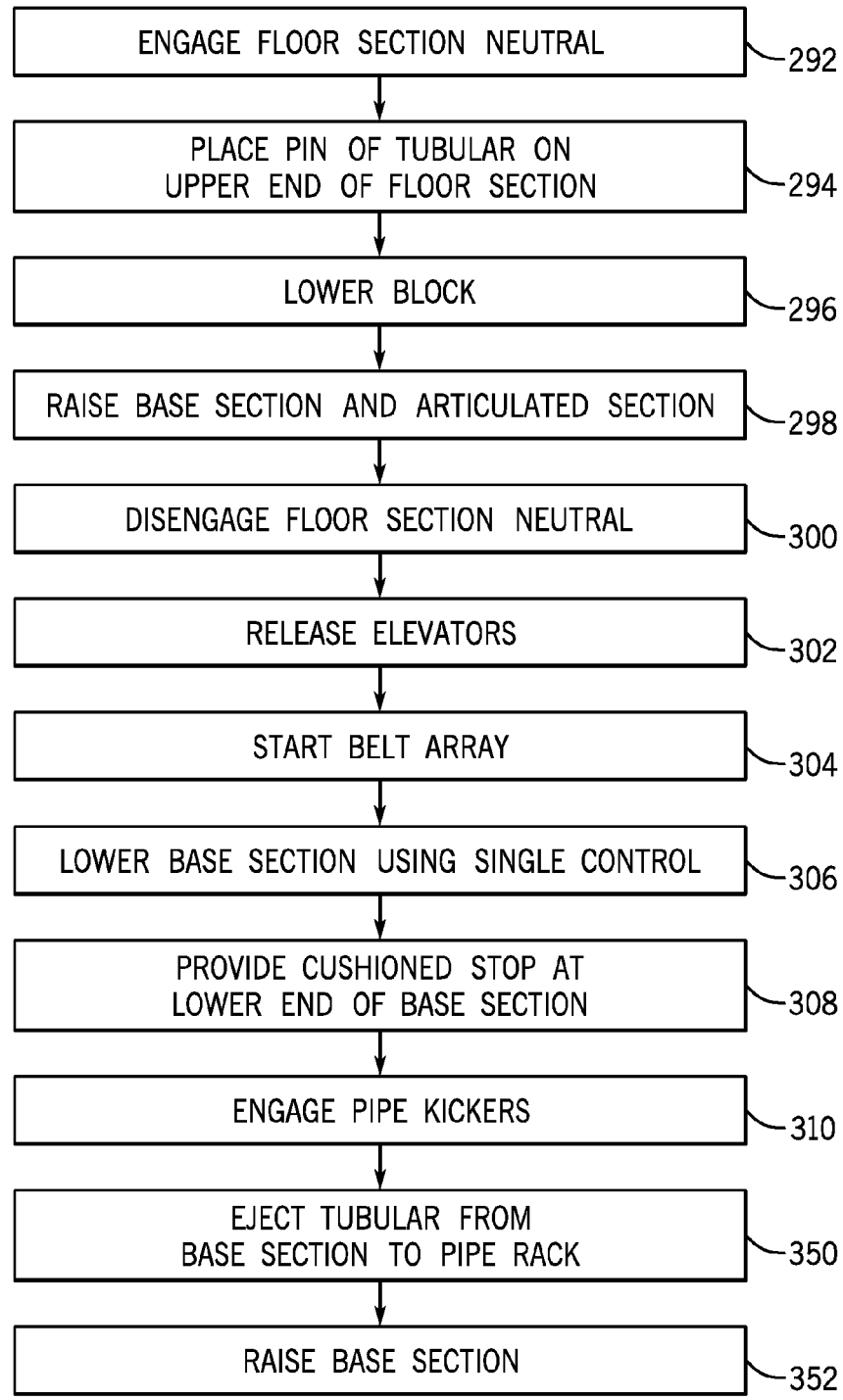
FIG. 14 is a process flow diagram of a method for transporting a length of tubular from a position at the rig floor to a position near the ground via the articulated conveyor assembly of FIG. 2 in accordance with an embodiment of the present techniques.

The conveyor assembly 48 may also aid in laydown operations that involve moving tubular elements 42 from a position on the rig floor 12 back to the catwalk area 58. FIG. 14 illustrates an embodiment of a method 290 for removing and transporting tubular elements 42 from the rig floor 12 to the catwalk area 58 (or the ground surface 46). It should be noted that, in some embodiments, steps of the method 290 may be performed in different orders than those shown, or omitted altogether. In addition, some of the blocks illustrated may be performed in combination with each other. This method 290 may begin with the tubular element 42 being separated from the rest of the tubular string 32 and held by elevators, or some other tubular grasping component located above the rig floor 12.

The method 290 includes engaging (block 292) a neutral control of the stationary floor section 50A. As discussed above, the floor section 50A may be placed in neutral so that the tubular element 42 can be moved along with the belt 110 of the floor section 50A. The method 290 also includes placing (block 294) the pin of the tubular element 42 on an upper end of the floor section 50A and lowering (block 296) the traveling block 22 so that the tubular element 42 rolls down the floor section 50A of the conveyor assembly 48 along with the freely moving belt 110. The method 290 further includes raising (block 298) the base and articulated sections 50B, 50C, and 50D under the exposed section of the tubular element 42 extending beyond the floor section 50A. These conveyor sections 50B, 50C, and 50D are raised via the frame actuation assembly 54 until they reach the preset raised position for receiving the tubular element 42.

When the tubular element 42 is fully laying across the raised conveyor assembly 48, the method 290 may include disengaging (block 300) the neutral control on the floor section 50A, releasing (block 302) the elevators to disengage them from the tubular element 42, and starting (block 304) the belt array of the conveyor assembly 48. At this point, the tubular element 42 is released from the rig floor components and travels freely down the conveyor assembly 48 on the moving belts 110. As the tubular element 42 travels down the assembly, the box (e.g., upper end portion) of the tubular element 42 passes the articulated point where the hydraulic arm 70 meets the conveyor sections 50. Once the tubular element 42 has passed this point (e.g., between the conveyor sections 50B and 50C), the method 290 includes lowering (block 306) the base section (e.g., conveyor sections 50C and 50D) using the single control mechanism that actuates the hydraulic arm 70. Concurrent to lowering the conveyor assembly 48, operators on the rig floor 12 may use the elevators and the traveling block 22 to pull the tubular string 32, set the slips 36 to hold the tubular string 32 in place, and break off another tubular element 42.

The method 290 may include providing (block 308) a cushioned stop at a lower end of the base section (e.g., conveyor section 50D). In some embodiments, the pin of the tubular element 42 may trip the "stop" mechanism that slows the rotation of the belt 110. The tubular element 42 may continue to move beyond the end of the conveyor section 50D another 2.5 feet, decelerate, and stop with the pin up to approximately 3 feet beyond the end of the conveyor section 50D. Specific mechanisms for providing this cushioned stop of the tubular element 42 are discussed in detail below.

Figure 15:
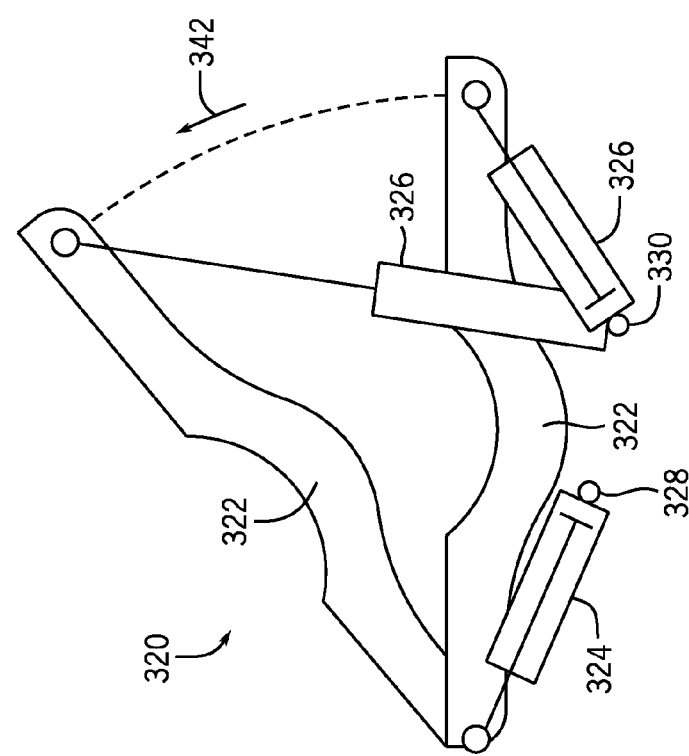
FIG. 15 is a schematic view of pipe kickers disposed on a base section of the articulated conveyor assembly of FIG. 2 in accordance with an embodiment of the present techniques.

Once the tubular element 42 is stopped, the method 290 may include engaging (block 310) pipe kickers that eject the tubular element 42 from the trough of the belt profile. FIG. 15 illustrates an embodiment of a pipe kicker 320 that may be used to eject the tubular element 42. Multiple pipe kickers 320 may be disposed at one or both ends of the conveyor section 50C and/or the conveyor section 50D. In the illustrated embodiment, the pipe kicker 320 includes a trough section 322 configured to support the tubular element when the pipe kicker 320 is not activated, and to eject the tubular element 42 when activated. Activation of the pipe kicker 320 may occur through the control of hydraulic cylinders 324 and 326 coupled one to each side of the trough section 322. These cylinders 324 and 326 may be rotatably coupled to the framework of the conveyor assembly 48 via pins 328 and 330, respectively.

Figure 16:
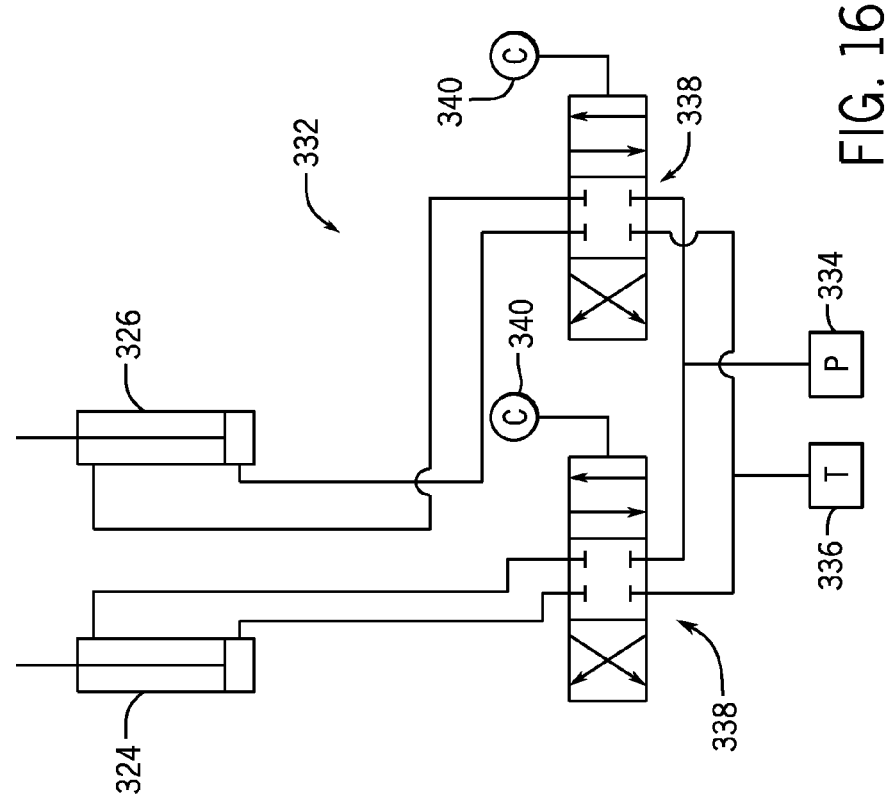
FIG. 16 is a diagrammatical representation of a hydraulic system for the pipe kickers of FIG. 15 in accordance with an embodiment of the present techniques.

A relatively simple control scheme may control the activation of the pipe kicker 320. FIG. 16 illustrates a piping arrangement 332 that may convey hydraulic fluid between the chambers of the two cylinders 324 and 326. A pump 334 may provide the hydraulic fluid into the piping arrangement 332 at a relatively high pressure, and the fluid may be expelled to a lower pressure tank 336. The chambers of each cylinder are in fluid communication with a valve 338 that switches the hydraulic fluid flow through the piping arrangement 332 based on signals from a controller 340. The controller 340, which may include one or more separate control features, may receive a control signal for activating the pipe kicker 320 to eject the tubular element 42 to one side or the other of the conveyor assembly 48, and the controller 340 may provide appropriate control signals for operating the valves 338.

In the embodiment illustrated in FIG. 15, just one cylinder 326 is actuated to tilt the trough section 322. As the cylinder 326 expands, the cylinder 326 also rotates about the pin 330, raising one end of the trough 322 (shown by arrow 342) while the opposite end remains pinned to the cylinder 324. The tubular element 42 resting in the trough 322 may thus be expelled from the conveyor assembly 48 and back to the pipe rack 242, or some other location. By using two cylinders 324 and 326 to actuate the pipe kickers 320, it may be possible to eject the tubular element 42 from either side of the conveyor assembly 48. As noted above, the conveyor assembly 48 may also eject the tubular elements 42, or other drilling equipment, from the lower end of the base section 50D, instead of one of the sides.

Turning back to FIG. 14, the method 290 may include ejecting (block 350) the tubular element 42 from the base section (e.g., conveyor section 50D) to the pipe rack 242, or to another location near the catwalk area 58. This may be accomplished through the use of the pipe kickers 320, as described in detail above, or manually. The method 290 also includes raising (block 352) the conveyor sections 50B, 50C, and 50D again to prepare the conveyor assembly 48 to receive the next length of tubular. From this point, the method 290 outlined in FIG. 14 may be repeated until no more tubular elements 42 remain above the rig floor 12.

It should be noted that the methods 230 and 290 may allow for concurrent activities to take place during the pickup and laydown operations of the drilling rig 10. These concurrent activities include loading the conveyor assembly 48 with a tubular element 42 while the tubular element 42 at the rig floor level is being transferred from the floor section 50A to the elevators and hoisted above the rig floor 12. In addition, the conveyor assembly 48 may lower one tubular element 42 while the rig crew works to uncouple another tubular from the tubular string 32. Through these concurrent activities, in addition to the use of the index/laydown arms 240 and the pipe kickers 320, the conveyor assembly 48 may reduce the time it takes to perform the pickup and laydown operations of the drilling rig 10. Further, the return waiting time for the conveyor assembly 48 is reduced compared to the waiting time for power catwalks, since the tubular element 42 may be supported and made up at the upper floor section 50A while the other conveyor sections 50B, 50C, and 50D are lowered to retrieve the next tubular element 42. The conveyor assembly 48 is equipped to perform concurrent operations throughout its use.

The conveyor assembly 48 may be used for other operations in addition to the pickup and laydown operations described above. In some embodiments, the conveyor assembly 48 may be used to perform culling operations. A number of options may be available for culling (e.g., identifying and removing) undesirable tubular element 42, instead of raising the tubular element 42 onto the rig floor 12. For example, the pipe kickers 320 may eject the undesirable tubular element 42 from the conveyor assembly 48. In some instances, the damaged tubular element 42 may be identified while the tubular element 42 is still on the pipe rack 242. In this case, the index/laydown arms 240 may pick up the tubular element 42 from the pipe rack 242 and dispose of the tubular element 42 away from the conveyor assembly 48. In still other embodiments that may not include the pipe kickers 320 or the index/laydown arms 240, an operator may control the conveyor assembly 48 to move the tubular element 42 in a direction opposite the rig floor 12, sending the tubular element 42 off the conveyor assembly 48 via the end 94 of the conveyor section 50D along the catwalk area 58.

In addition to culling operations, it should be noted that the conveyor assembly 48 is configured to handle other types of drilling equipment other than tubular elements 42. For example, the conveyor assembly 48 may receive and transport specialized equipment such as downhole tools, motors, and other accessories. Such equipment, particularly the equipment being delivered downhole, may be generally long and cylindrical in shape and, consequently, able to fit into the concave profile of the belts 110 that convey the equipment up to the rig floor 12. This equipment may be loaded onto the conveyor assembly 48 from the far end 94, instead of from the pipe racks 242, as this equipment may be more delicate and not stored with the drillpipe.

Figure 17:
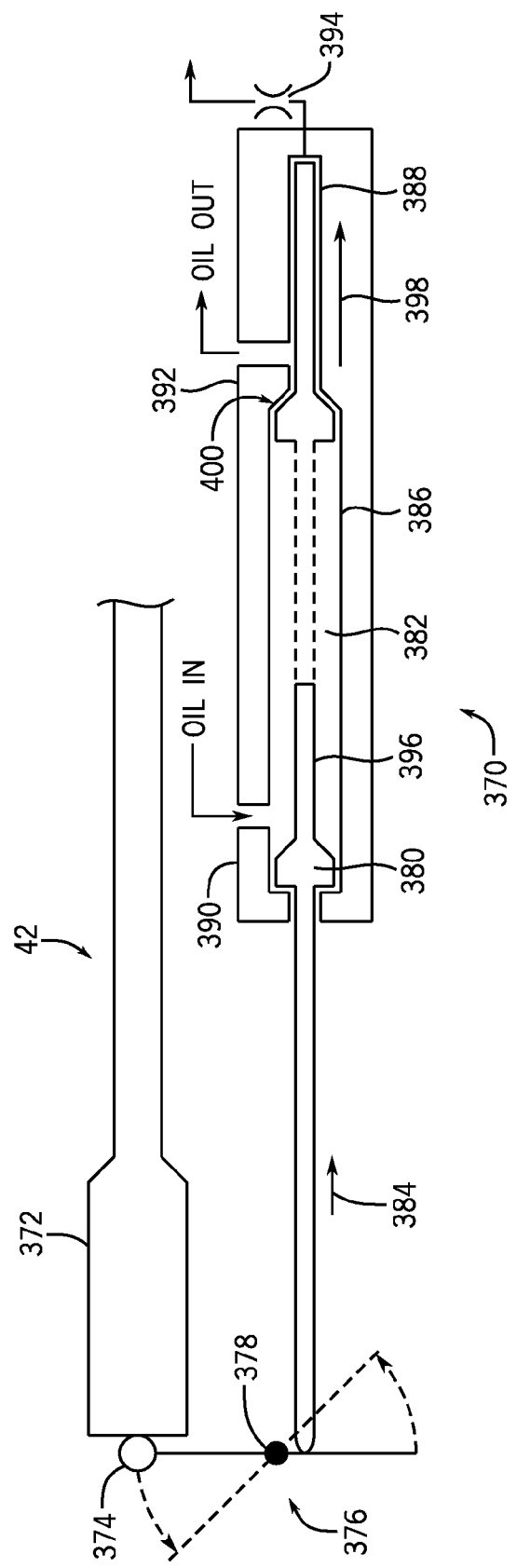
FIG. 17 is a schematic cross sectional view of a cushioned stop assembly of the articulated conveyor assembly of FIG. 2 in accordance with an embodiment of the present techniques.

As noted above, the conveyor assembly 48 may include features that provide a cushioned stop to the tubular elements 42 that are being brought up to the rig floor 12 or that are being delivered down to the catwalk area 58. FIG. 17 illustrates an embodiment of a cushioned stop mechanism 370 that may provide this stop. The illustrated cushioned stop mechanism 370 utilizes the weight and movement of the tubular element 42 traveling along the conveyor assembly 48 to slow the tubular element 42 at a certain point beyond the end of a conveyor section (e.g., 50A, 50D). Specifically, the cushioned stop mechanism transfers force from the moving tubular to displace hydraulic fluid. As the tubular element 42 reaches the end of the conveyor assembly 48, a box 372 of the tubular element 42 impacts a roller 374. This roller 374 is coupled to one end of a lever 376 that pivots about a pivot point 378. The opposite end of the lever 376 pushes a plug 380 into a chamber 382 of hydraulic fluid (e.g., oil), as shown by arrow 384. This chamber 382 may include an interior portion with a major inner diameter 386 in fluid communication with an interior portion having a smaller minor inner diameter 388. In addition, the chamber 382 may include an inlet 390 into the section with the major inner diameter 386 and two outlets 392 and 394 in the section with the minor inner diameter 388.

During operation, the tubular element 42 trips the lever 376 as the motor of the conveyor section 50 is operating at full speed. The lever 376 pushes the plug 380 through the larger section of the chamber 382, and at this time the conveyor section 50 is still operating at full speed. As the plug 380 moves through the chamber 382, a cushion 396 of the plug 380 may enter the smaller diameter section, as shown by arrow 398, covering the first outlet 392 and causing resistance that decelerates the speed of the conveyor section 50. The conveyor assembly 48 stops completely when the plug 380 meets a seat 400 in the chamber 382. In some embodiments, the flow control of hydraulic fluid being pushed into the chamber 382 may be adjusted to change the rate of deceleration.

The fully mechanical cushioned stop mechanism 370 allows the tubular element 42 and the conveyor assembly 48 to come to a complete stop when the tubular element 42 reaches an end of the conveyor assembly 48, regardless of whether an operator is actively watching or controlling the conveyor assembly 48. This may ensure that no collisions occur between equipment traveling up or down the conveyor assembly 48 and equipment or operators positioned on the rig floor 12 or the catwalk area 58. It should be noted that, while the cushioned stop mechanism 370 illustrated in FIG. 17 is operated via an automatic mechanical process, in other embodiments the conveyor assembly 48 may implement a cushioned stop via more sophisticated hydraulic controls.

Figure 18:
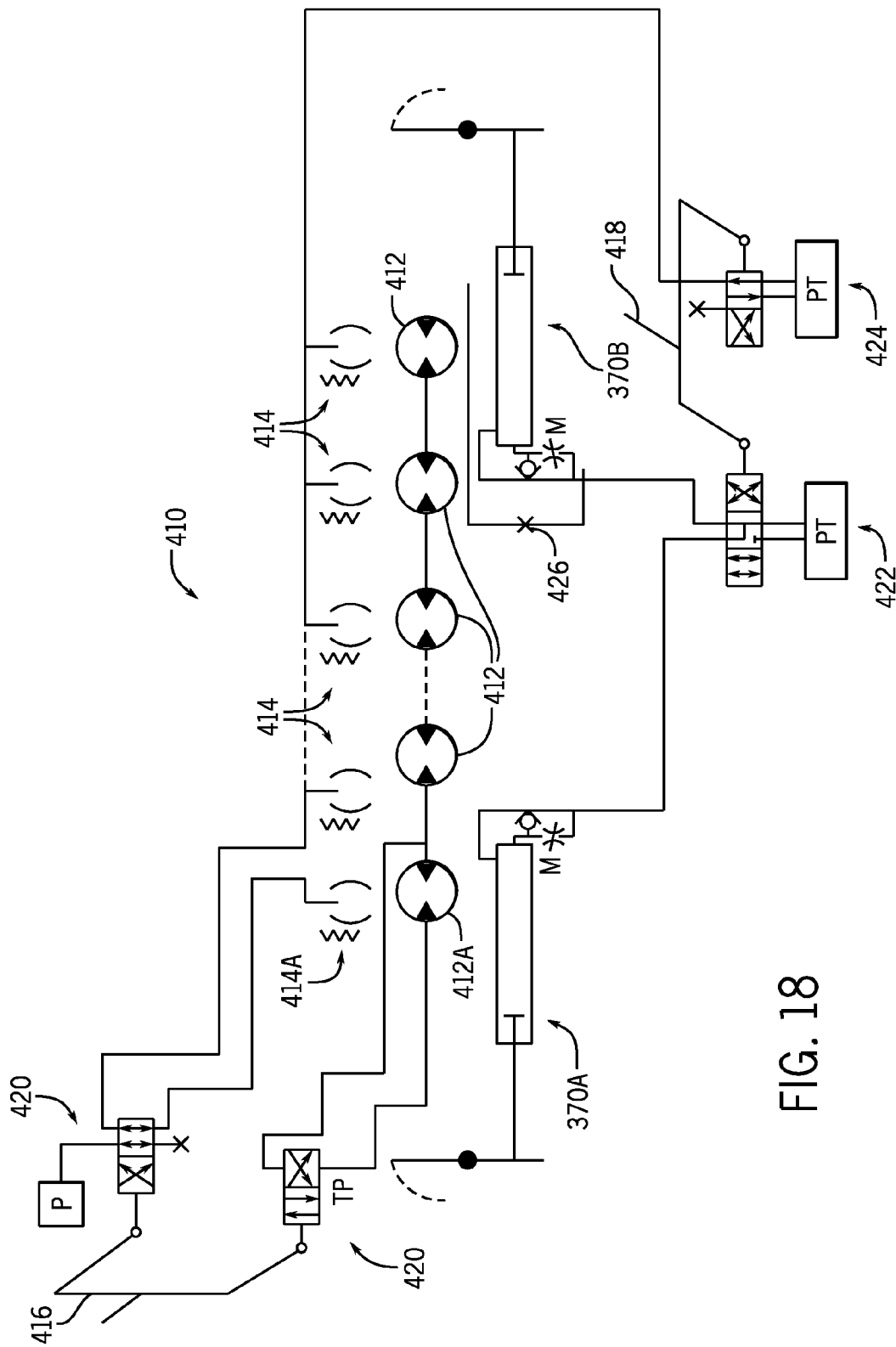
FIG. 18 is a diagrammatical representation of a hydraulics system for the articulated conveyor assembly of FIG. 2 in accordance with an embodiment of the present techniques.

FIG. 18 is a schematic illustrating a hydraulics system 410 used to control and operate the movement of the belts 110 on the array of conveyor sections 50, in accordance with an embodiment. As noted above, the conveyor assembly 48 may include a linear array of any desired number of conveyor sections 50. Each of the conveyor sections 50 may be equipped with a positive displacement hydraulic motor 412 coupled with a hydraulic spring actuated brake 414. The combined hydraulic motor 412 and brake 414 may urge movement of the conveyor belt 110 around each of the conveyor sections 50. In the illustrated embodiment, a hydraulic motor 412A and brake 414A represent the motor and brake combination that is used to power the stationary floor section 50A. The hydraulic motors 412 are in fluid communication with each other and are configured to operate at the same speed. The system may be expanded to accommodate any number of hydraulic motors 412 in series.

At either end of the array of hydraulic motors 412 and brakes 414, the hydraulics system 410 may include the above described cushioned stop mechanisms 370. One of the cushioned stop mechanisms 370A is disposed at the rig floor level near the floor section 50A, and another cushioned stop mechanism 370B is located at the catwalk area 58 near the far end base section 50D. These cushioned stop mechanisms 370 are hydraulically linked with the motors 412, in order to convert the mechanical energy from a passing tubular element 42 into braking energy for stopping the hydraulic motors 412.

In the illustrated embodiment, the hydraulics system 410 is controlled primarily through two manual control levers 416 and 418. The control lever 416 is disposed at the rig floor 12 and may be switched between two settings by an operator on the rig floor 12. The control lever 416 may be connected to a series of two manual hydraulic valves 420. Together, this pair of hydraulic valves 420 allows the upper end hydraulic motor 412A (i.e., the motor of the floor section 50A) to freewheel while allowing the other hydraulic motors 412 to use their spring applied brakes 414. Specifically, the hydraulic valves 420 release the brake 414A at the floor section 50A, although these valves cannot override the brakes 414 on the other conveyor sections 50. As discussed in detail above, the freewheel, or neutral, control of the floor section 50A allows the belt 110 on the floor section 50A to move with the tubular element 42 being pulled or pushed over the belt 110. It should be noted that the cushioned stop mechanism 370A still functions to stop the tubular element 42 coming off the floor section 50A, even after the freewheel control is engaged via the manual control lever 416.

The control lever 418 is disposed at the opposite end of the conveyor assembly 48, near the catwalk area 58 or ground level, and the control lever 418 may be switched between two settings by an operator at this level. The control lever 418 may be connected to a series of two manual hydraulic valves 422. The hydraulic valve 422 powers the hydraulic motors 412 the rotate the belts 110 around their corresponding conveyor sections 50. The hydraulic valve 424 powers a brake release that releases the spring applied brakes 414 on all of the conveyor sections 50. As a result, the control lever 418 may be manually actuated to switch the hydraulic motors 412 between operational and unoperational states.

In addition to these controls, the hydraulics system 410 may include a bypass valve 426 disposed in a fluid line that bypasses the cushioned stop mechanism 370B. This bypass valve 426 allows the tubular element 42 or other drilling equipment to exit the conveyor assembly 48 from the end 94, instead of the side, of the conveyor assembly 48. When opened, the bypass valve 426 allows hydraulic fluid to bypass the cushioned stop mechanism 370B, and this effectively overrides the cushioned stop mechanism 370B. Without the hydraulic fluid to cushion the stop, the lever rotates completely out of the way of the tubular element 42 so that the tubular element 42 can be slid off the conveyor assembly 48 from the end 94.

The controls of the hydraulics system 410 illustrated in FIG. 18 allow just two operable features to control the movements of the belts 110 along the conveyor assembly 48. In addition, the cushioned stop mechanisms 370 provide an automatic stop feature in case the manually operated control levers 416 and 418 are not being applied correctly. However, the cushioned stop mechanism 370 does not get in the way of tubular elements 42 being loaded or unloaded from the end 94 of the conveyor assembly 48, because of the bypass valve 426. The controls of these hydraulics, as well as the controls of the frame actuation assembly 54 for lifting and lowering the conveyor sections 50, are relatively simple to implement, with many of the motions controlled by geometries of the conveyor system. In some embodiments, no automation controllers, encoders, proximity switches, or similarly complicated control features are used to operate the conveyor assembly 48. Yet, in such embodiments the system is operated in a reliable and efficient manner.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A conveyor assembly configured to transport a tubular onto a drilling rig, comprising:

a plurality of articulating conveyor sections coupled together end to end and configured to receive and transport the tubular;

a stationary conveyor section disposed in a stationary position on a rig floor of the drilling rig, wherein the stationary conveyor section and each of the plurality of articulating conveyor sections comprises a conveyor belt having treads for transporting the tubular along the respective conveyor section; and an actuation assembly configured to transition the plurality of articulating conveyor sections between a first orientation and a second orientation, wherein the plurality of articulating conveyor sections and the stationary conveyor section are not aligned in the first orientation, and wherein the plurality of articulating conveyor sections and the stationary conveyor section are substantially aligned in the second orientation.

2. The conveyor assembly of claim 1, wherein each of the plurality of articulating conveyor sections comprises the conveyor belt and a frame that holds the conveyor belt, wherein the frames of adjacent articulating conveyor sections are moveably coupled together, and wherein the actuation assembly is configured to move at least some of the frames relative to each other to transition the plurality of articulating conveyor sections between the first and second orientations.

3. The conveyor assembly of claim 1, wherein the actuation assembly comprises a hydraulic linkage coupled to one or more of the plurality of articulating conveyor sections.

4. The conveyor assembly of claim 3, wherein the hydraulic linkage is a two-stage hydraulic arm.

5. The conveyor assembly of claim 1, wherein the treads comprise a concave profile for receiving and holding the tubular.

6. The conveyor assembly of claim 1, wherein each of the plurality of articulating conveyor sections comprises a hydraulic motor configured to actuate movement of the treads relative to a frame of the articulating conveyor section.

7. The conveyor assembly of claim 6, wherein the hydraulic motors of each of the plurality of articulating conveyor sections are configured to actuate movement of the respective treads at the same speed.

8. The conveyor assembly of claim 1, wherein the stationary conveyor section is coupled to the plurality of articulating conveyor sections.

9. The conveyor assembly of claim 1, comprising pipe kickers disposed on one or more of the plurality of articulating conveyor sections, wherein the pipe kickers are configured to lift the tubular relative to the one or more articulating conveyor sections such that the tubular element rolls off the conveyor assembly.

10. A conveyor assembly configured for use on a drilling rig, comprising:

a stationary conveyor section coupled to a rig floor of the drilling rig;

an articulating conveyor section disposed adjacent the stationary conveyor section and configured to move relative to the stationary conveyor section;

a base conveyor section coupled to an end of the articulating conveyor section opposite the stationary conveyor section; and an actuation assembly configured to transition the articulating conveyor section and the base conveyor section between a lowered position and a raised position;

wherein, in the lowered position, the base conveyor section is disposed proximate a catwalk area and the articulating conveyor section is disposed against an inclined ramp between the catwalk area and the rig floor;

wherein, in the raised position, the base conveyor section and the articulated conveyor section are substantially aligned with the stationary conveyor section;

wherein the stationary conveyor section, the articulating conveyor section, and the base conveyor section each comprises a conveyor belt comprising treads for transporting a tubular along the respective conveyor section.

11. The conveyor assembly of claim 10, wherein the stationary conveyor section is a separate piece from the articulated conveyor section and the base conveyor section.

12. The conveyor assembly of claim 10, wherein the stationary conveyor section is configured to index in a mousehole on the rig floor.

13. The conveyor assembly of claim 10, wherein the actuation assembly comprises stops configured to be manually set to adjust the raised position of the conveyor assembly.

14. The conveyor assembly of claim 10, comprising a cushioned stop mechanism disposed on the stationary conveyor section and configured to slow movement of the treads along the stationary conveyor section when an upper portion of a tubular extends a distance beyond an upper end of the stationary conveyor section.

15. The conveyor assembly of claim 10, comprising a cushioned stop assembly disposed on the base conveyor section and configured to slow movement of the treads along the base conveyor section when a lower portion of a tubular extends a distance beyond a lower end of the base conveyor section.

* * * * *